United States Patent
Dunivan

(10) Patent No.: US 9,538,768 B2
(45) Date of Patent: Jan. 10, 2017

(54) AUTOMATED SCANNING AND BUTCHERING SYSTEM AND METHOD OF USE

(71) Applicant: Midwest Machine, LLC, Amarillo, TX (US)

(72) Inventor: Steve Dunivan, Amarillo, TX (US)

( * ) Notice: Subject to any disclaimer, the term of this patent is extended or adjusted under 35 U.S.C. 154(b) by 0 days.

(21) Appl. No.: 14/857,790

(22) Filed: Sep. 17, 2015

(65) Prior Publication Data

US 2016/0106112 A1 Apr. 21, 2016

Related U.S. Application Data

(60) Provisional application No. 62/051,767, filed on Sep. 17, 2014.

(51) Int. Cl.
| | | |
|---|---|---|
| A22C 25/00 | (2006.01) | |
| A22C 17/00 | (2006.01) | |
| A22C 17/02 | (2006.01) | |

(52) U.S. Cl.
CPC ........ *A22C 17/0086* (2013.01); *A22C 17/0006* (2013.01); *A22C 17/02* (2013.01)

(58) Field of Classification Search
CPC ...... A22B 5/0041; A22B 5/0029; A22B 5/007
USPC .................. 452/149–153, 155–157
See application file for complete search history.

(56) References Cited

U.S. PATENT DOCUMENTS

| | | | | |
|---|---|---|---|---|
| 4,246,837 A | * | 1/1981 | Chenery | A22C 17/008 452/134 |
| 5,882,252 A | * | 3/1999 | Boody | A22B 5/0041 452/136 |
| 6,547,658 B2 | * | 4/2003 | Boody | A22B 5/0035 452/134 |
| 6,604,991 B1 | * | 8/2003 | Jurs | B26D 5/00 452/150 |
| 6,843,169 B2 | * | 1/2005 | Nielsen | A22C 21/0053 452/156 |
| 7,251,537 B1 | * | 7/2007 | Blaine | A22C 17/0086 452/156 |
| 7,285,040 B2 | * | 10/2007 | Ilch | A22B 5/0029 452/150 |
| 7,452,266 B2 | * | 11/2008 | Bottemiller | A22C 7/00 452/150 |
| 7,841,264 B2 | * | 11/2010 | Kim | B26D 3/10 452/156 |
| 7,918,718 B2 | * | 4/2011 | Christensen | A22B 5/007 452/157 |

(Continued)

*Primary Examiner* — Richard Price, Jr.
(74) *Attorney, Agent, or Firm* — Shannon L Warren

(57) ABSTRACT

An automated scanning and butchering system is disclosed. Said system having a PLC system, a scanning system and a butchering system in data communication. The butchering system comprising a one or more saw assemblies, a conveyor system, a one or more cradles, and a first end and a second end. The one or more saw assemblies are arranged between the first end and the second end of the butchering system. The conveyor system comprises a conveyor comprising the one or more cradles configured to move items from the first end to the second end of the butchering system. The one or more cradles are configured to releaseably receive and hold a target object as the conveyor moves the target object from the first end to the second end of the butchering system. The scanning system comprising a one or more scanners.

17 Claims, 22 Drawing Sheets

(56) References Cited

U.S. PATENT DOCUMENTS

| | | | | |
|---|---|---|---|---|
| 7,949,414 B2 * | 5/2011 | Blaine | ............... | B26D 3/10 |
| | | | | 198/341.04 |
| 8,096,860 B2 * | 1/2012 | Bolte | ............... | A22C 17/002 |
| | | | | 452/157 |
| 8,986,080 B2 * | 3/2015 | Black | ............... | A22B 5/166 |
| | | | | 452/150 |

\* cited by examiner

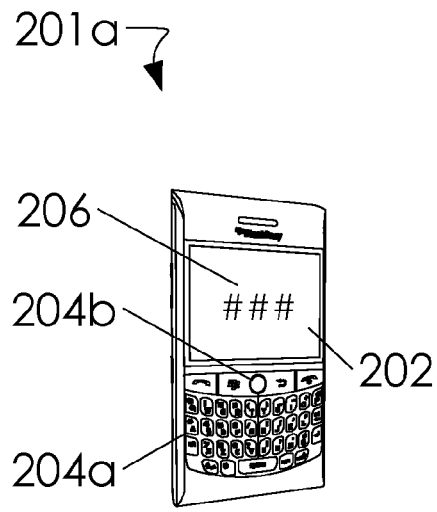
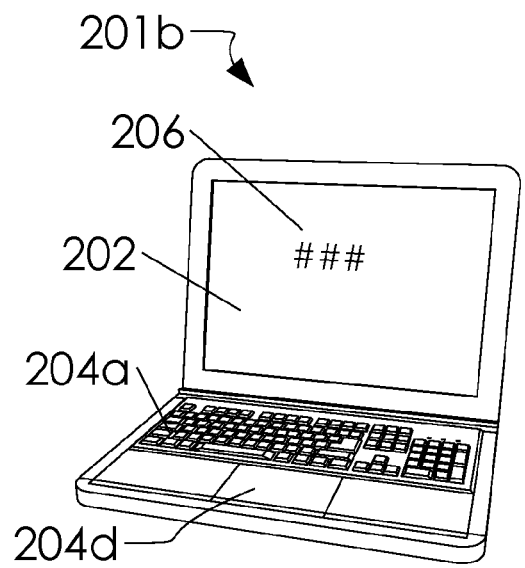
FIG. 2A
FIG. 2B
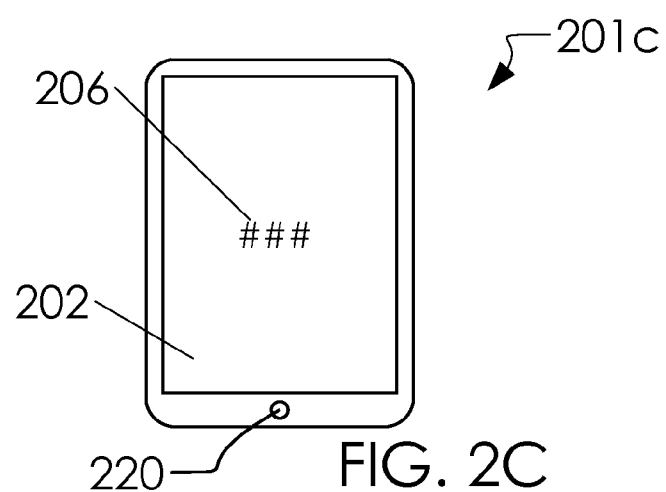
FIG. 2C

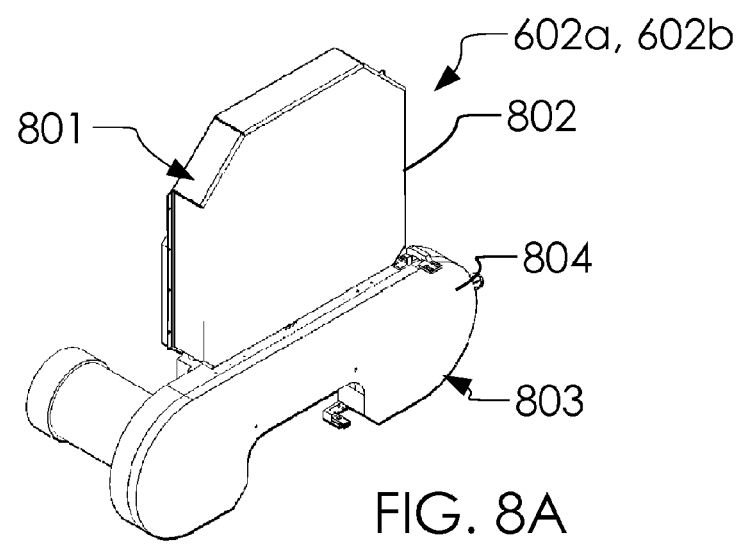
FIG. 8A
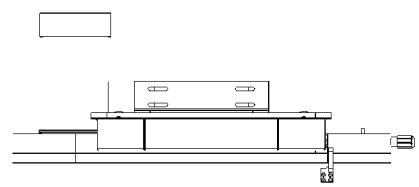
FIG. 8B
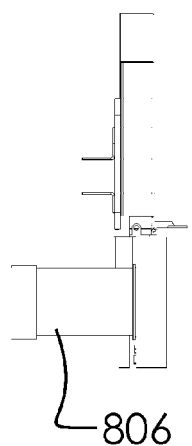
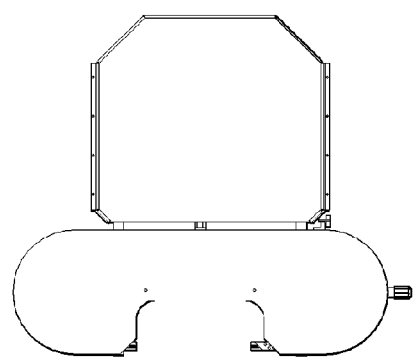
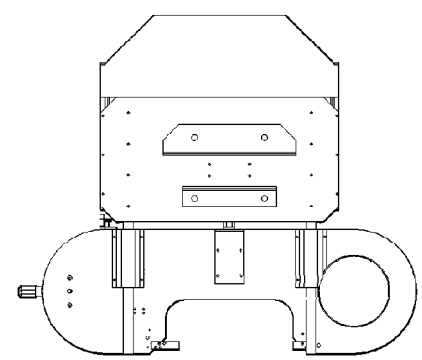
FIG. 8C   FIG. 8D   FIG. 8E

AUTOMATED SCANNING AND BUTCHERING SYSTEM AND METHOD OF USE

CROSS-REFERENCE TO RELATED APPLICATIONS

This application claims the benefit of U.S. Patent Application No. 62/051,767 filed on Sep. 17, 2014, which is hereby incorporated by reference.

STATEMENT REGARDING FEDERALLY SPONSORED RESEARCH OR DEVELOPMENT (IF APPLICABLE)

Not applicable.

REFERENCE TO SEQUENCE LISTING, A TABLE, OR A COMPUTER PROGRAM LISTING COMPACT DISC APPENDIX (IF APPLICABLE)

Not applicable.

BACKGROUND OF THE INVENTION

This disclosure relates generally to an automated scanning and butchering system and method of use. None of the known inventions and patents, taken either singularly or in combination, is seen to describe the instant disclosure as claimed. Accordingly, an improved Automated Scanning and Butchering System and Method of Use would be advantageous.

BRIEF SUMMARY OF THE INVENTION

A system and a method are disclosed.

An automated scanning and butchering system is disclosed. Said system having a PLC system, a scanning system and a butchering system in data communication. The butchering system comprising a one or more saw assemblies, a conveyor system, a one or more cradles, and a first end and a second end. The one or more saw assemblies are arranged between the first end and the second end of the butchering system. The conveyor system comprises a conveyor comprising the one or more cradles configured to move items from the first end to the second end of the butchering system. The one or more cradles are configured to releaseably receive and hold a target object as the conveyor moves the target object from the first end to the second end of the butchering system. The scanning system comprising a one or more scanners.

A method of automatically scanning and butchering meat is disclosed. The method comprising: conveying a target object a one or more scanners on a conveyor belt of an automated scanning and butchering system, scanning the target object with a one or more scanners and creating a 3D Model thereof, identifying a trim line of the target object, conveying the target object toward the one or more saw assemblies on the conveyor belt, and cutting the target object with the one or more saw assemblies. The automated scanning and butchering system comprises a PLC system, a scanning system and a butchering system in data communication. The butchering system comprising a one or more saw assemblies, a conveyor system, a one or more cradles, and a first end and a second end. The one or more saw assemblies are arranged between the first end and the second end of the butchering system. The conveyor system comprises a conveyor comprising the one or more cradles configured to move items from the first end to the second end of the butchering system. The one or more cradles are configured to releaseably receive and hold a target object as the conveyor moves the target object from the first end to the second end of the butchering system. The scanning system comprising a one or more scanners.

BRIEF DESCRIPTION OF THE SEVERAL VIEWS OF THE DRAWING

FIGS. 2A, 2B and 2C illustrate a perspective overview of a mobile phone 201a, a personal computer 201b and a tablet 201c.

FIGS. 4A and 4B illustrate two embodiments for collecting and storing data with said automated scanning and butchering system 100; a first embodiment with a flow diagram between said first computer 102a and said server 108, and a second embodiment comprising of just said first computer 102a.

FIGS. 8A, 8B, 8C, 8D and 8E illustrate an elevated overview, an elevated top view, an elevated first side view, an elevated front view and an elevated backside view of said first saw assembly 602a.

FIG. 10 illustrates an elevated rear overview of said first saw assembly 602a.

FIGS. 14A and 14B illustrate an elevated overview and an exploded elevated overview of said first scanner 606a.

DETAILED DESCRIPTION OF THE INVENTION

Described herein is a Automated Scanning and Butchering System and Method of Use. The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system-and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

Figure 1:
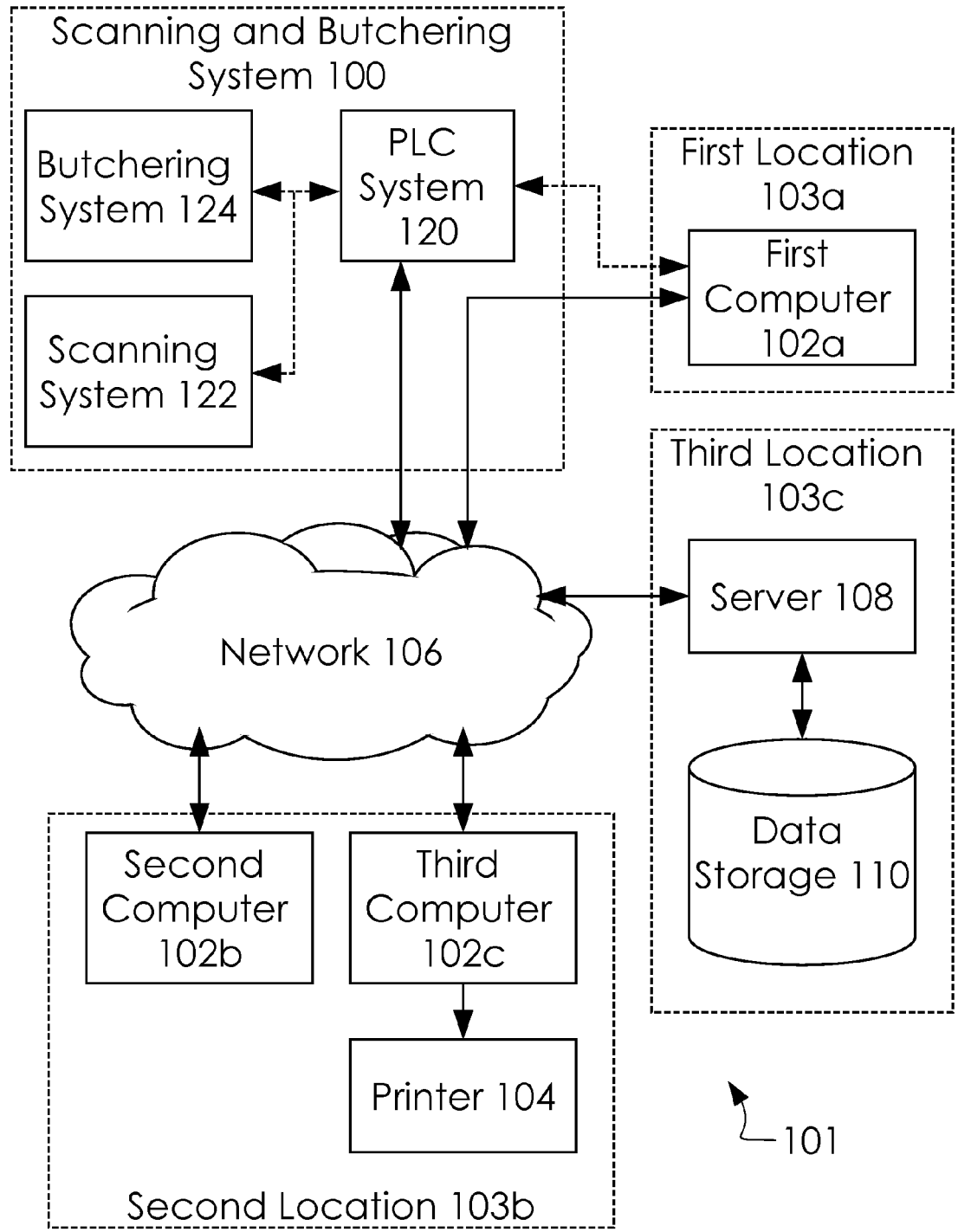
FIG. 1 illustrates a first network configuration 101 of an automated scanning and butchering system 100.

FIG. 1 illustrates a first network configuration 101 of an automated scanning and butchering system 100.

In one embodiment, said automated scanning and butchering system 100 can comprise a one or more computers at a one or more locations. In one embodiment, said one or more computers can comprise a first computer 102a, a second computer 102b and a third computer 102c. In one embodiment, said one or more locations can comprise a first location 103a, a second location 103b and a third location 103c. In one embodiment, said first location can comprise a field location. In one embodiment, said one or more computers can communicate on a network 106, which can connect to a one or more servers (such as a server 108). In one embodiment, a printer 104 can be hardwired to said first computer 102a (not illustrated here), or said printer 104 can connect to one of said one or more computers (such as said third computer 102c, illustrated) via network 106.

Said network 106 can be a local area network (LAN), a wide area network (WAN), a piconet, or a combination of LANs, WANs, or piconets. One illustrative LAN is a network within a single business. One illustrative WAN is the Internet.

In one embodiment, said server 108 represents at least one, but can be many servers, each connected to said network 106. Said server 108 can connect to a data storage 110. Said data storage 110 can connect directly to said server 108, as shown in FIG. 1, or may exist remotely on said network 106. In one embodiment, said data storage 110 can comprise any suitable long-term or persistent storage device and, further, may be separate devices or the same device and may be collocated or distributed (interconnected via any suitable communications network).

In one embodiment, said automated scanning and butchering system 100 can comprise a PLC system 120, a scanning system 122 and a butchering system 124. In one embodiment, said PLC system 120 can comprise a "programmable logic controller", which can comprise a computer used for automation of various processes. Here, said PLC system 120 can control said scanning system 122 and said butchering system 124 in real-time or near real-time, as is known in the art.

FIGS. 2A, 2B and 2C illustrate a perspective overview of a mobile phone 201a, a personal computer 201b and a tablet 201c.

In the last several years, the useful definition of a computer has become more broadly understood to include mobile phones, tablet computers, laptops, desktops, and similar. For example, Microsoft®, have attempted to merge devices such as a tablet computer and a laptop computer with the release of "Windows® 8". In one embodiment, said one or more computers each can include, but is not limited to, a laptop (such as said personal computer 201b), desktop, workstation, server, mainframe, terminal, a tablet (such as said tablet 201c), a phone (such as said mobile phone 201a), and/or similar. Despite different form-factors, said one or more computers can have similar basic hardware, such as a screen 202 and a one or more input devices (such as a keyboard 204a, a trackball 204b, a one or more cameras, a wireless—such as RFID—reader, a track pad 204d, and/or a home button 220). In one embodiment, said screen 202 can comprise a touch screen. In one embodiment, said track pad 204d can function similarly to a computer mouse as is known in the art. In one embodiment, said tablet 201c and/or said personal computer 201b can comprise a Microsoft® Windows® branded device, an Apple® branded device, or similar. In one embodiment, said tablet 201c can be an X86 type processor or an ARM type processor, as is known in the art.

Said automated scanning and butchering system 100 can comprise a data 206. In one embodiment, said data 206 can comprise data related to financial transactions.

In one embodiment, said one or more computers can be used to input and view said data 206. In one embodiment, said data 206 can be input into said one or more computers by taking pictures with one of said one or more camera, by typing in information with said keyboard 204a, or by using gestures on said screen 202 (where said screen 202 is a touch screen). Many other data entry means for devices similar to said one or more computers are well known and herein also possible with data 206. In one embodiment, said first computer 102a can comprise an iPhone®, a BlackBerry®, a smartphone, or similar. In one embodiment, one or more computers can comprise a laptop computer, a desktop computer, or similar.

Figure 3A:
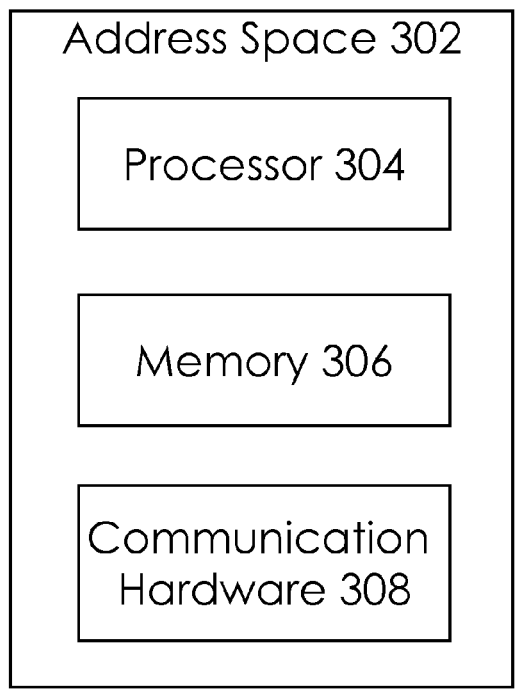
FIGS. 3A, 3B and 3C illustrate an address space 302 within said one or more computers, an address space 302a and an address space 302d.
Figure 3B:
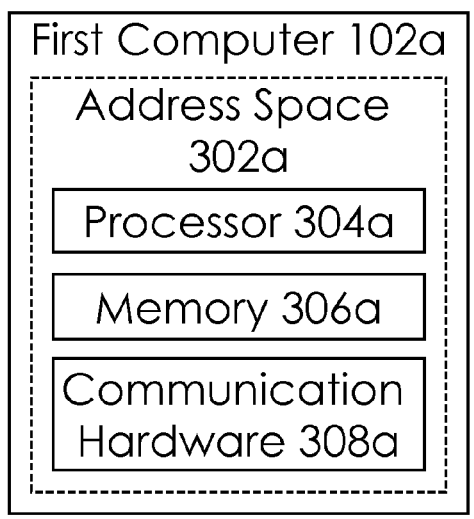
Figure 3C:
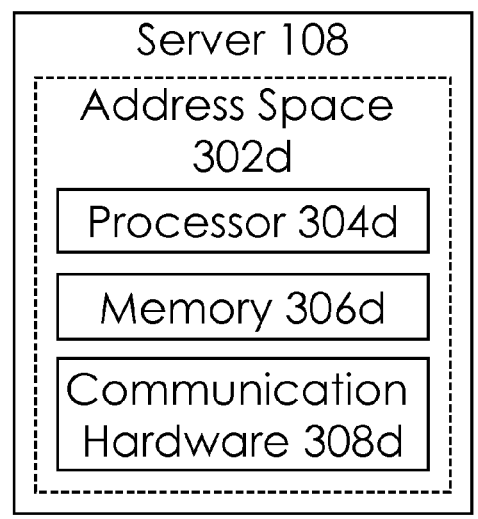

FIGS. 3A, 3B and 3C illustrate an address space 302 within said one or more computers, an address space 302a and an address space 302d.

Each among said one or more computers and said server 108 can comprise an embodiment of address space 302. In one embodiment, said address space 302 can comprise a processor 304, a memory 306, and a communication hardware 308. In one embodiment, said processor 304 can comprise a plurality of processors, said memory 306 can comprise a plurality of memory modules, and said communication hardware 308 can comprise a plurality of communication hardware components. In one embodiment, said data 206 can be sent to said processor 304; wherein, said processor 304 can perform processes on said data 206 according to an application stored in said memory 306, as discussed further below. Said processes can include storing said data 206 into said memory 306, verifying said data 206 conforms to a one or more preset standards, or ensuring a required set among said required data 206 has been gathered for said data management system and method. In one embodiment, said data 206 can include data which said one or more computers can populate automatically, such as a date and a time, as well as data entered manually. Once a portion of gathering data has been performed said data 206 can be sent to said communication hardware 308 for communication over said network 106. Said communication hardware 308 can include a network transport processor for packetizing data, communication ports for wired communication, or an antenna for wireless communication. In one embodiment, said data 206 can be collected in one or more computers and delivered to said server 108 through said network 106.

In one embodiment, said first computer 102a can comprise said address space 302a, a processor 304a, a memory 306a, and a communication hardware 308a. Likewise, in one embodiment, said server 108 can comprise said address space 302d, a processor 304d, a memory 306d, and a communication hardware 308d.

Figure 4A:
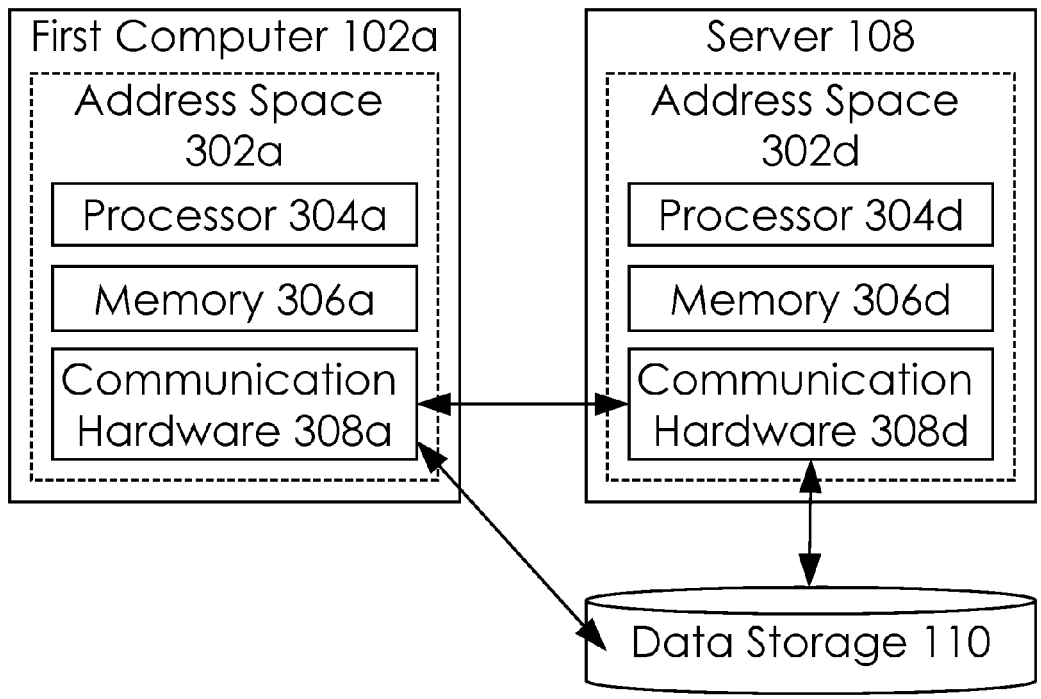
Figure 4B:
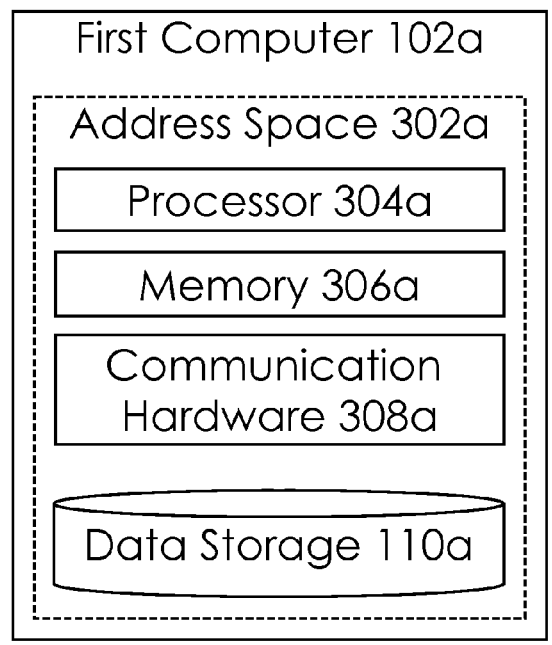

FIGS. 4A and 4B illustrate two embodiments for collecting and storing data with said automated scanning and butchering system 100; a first embodiment with a flow diagram between said first computer 102a and said server 108, and a second embodiment comprising of just said first computer 102a.

In the first embodiment, said communication hardware 308a and said communication hardware 308d can send and receive data to and from one another and or can communicate with said data storage 110 across said network 106. Likewise, in the second embodiment, data storage 110 can be embedded inside of said one or more computers as a data storage 110a, which may speed up data communications by said automated scanning and butchering system 100. In another embodiment, said data can be stored temporarily on said data storage 110a and later moved to said data storage 110 for backup and sharing purposes.

As illustrated in FIG. 4A, in one embodiment, said server 108 can comprise a third party data storage and hosting provider or privately managed as well.

As illustrated in FIG. 4B, said data storage 110 can be located on said first computer 102a, here labeled as said data storage 110a. Thus, said first computer 102a can operate without a data connection out to said server 108 while performing said system and method for field capture of data.

Figure 5A:
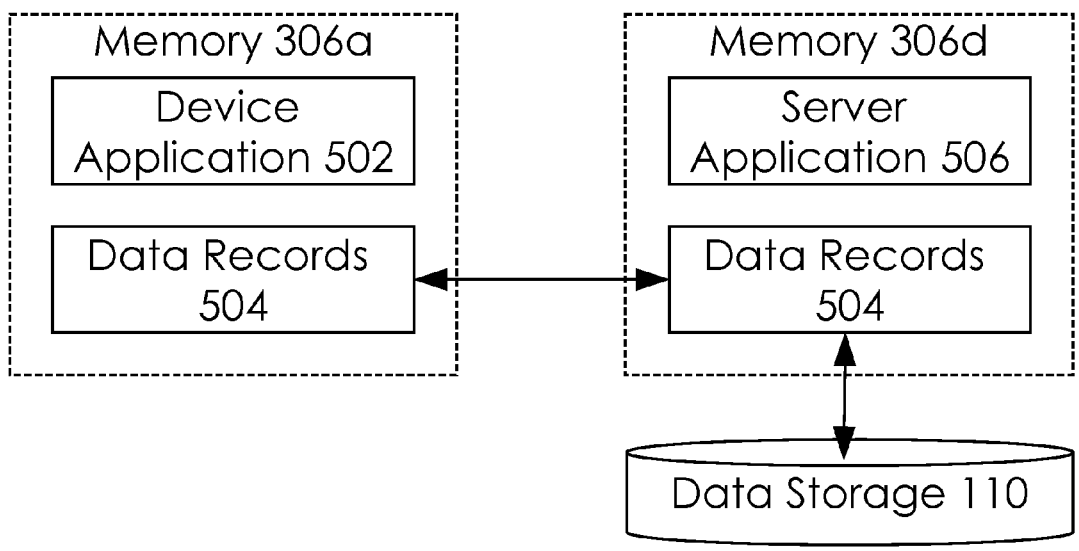
FIGS. 5A and 5B illustrate two examples of a flow diagram between said memory 306a and said memory 306d.
Figure 5B:
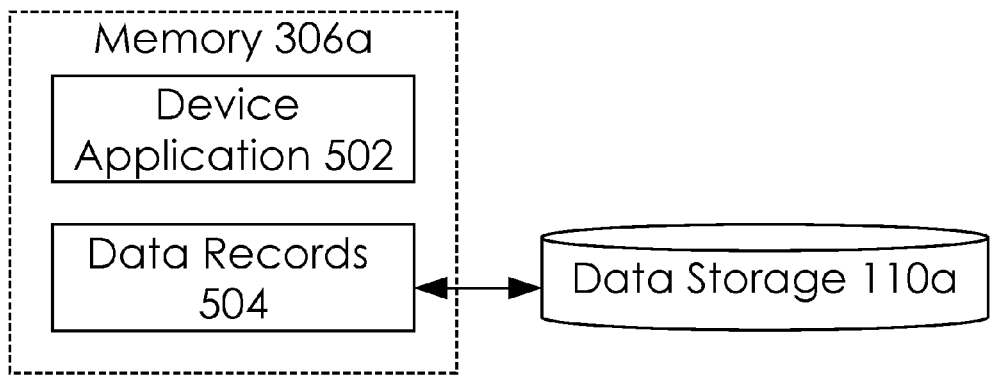

FIGS. 5A and 5B illustrate two examples of a flow diagram between said memory 306a and said memory 306d.

As illustrated in FIG. 5A, in one embodiment, said automated scanning and butchering system 100 can process said data 206 on said first computer 102a and/or said server 108. For example, in one embodiment, said memory 306a can comprise a device application 502 capable of generating a data records 504 from user inputs or, otherwise, processing said data records 504 delivered to said device application 502 from said data storage 110. In one embodiment, said data records 504 can be transferred between said device application 502 on said memory 306a of said first computer 102a and a server application 506 in said memory 306d of said server 108. In one embodiment, said server 108 can be useful for processing said data 206, as is known in the art. As illustrated in FIG. 5B, in another embodiment, said server 108 can be removed from the flow diagram entirely as said memory 306a is capable of processing said data records 504 and/or said data 206 without the assistance of said server 108.

Figure 6:
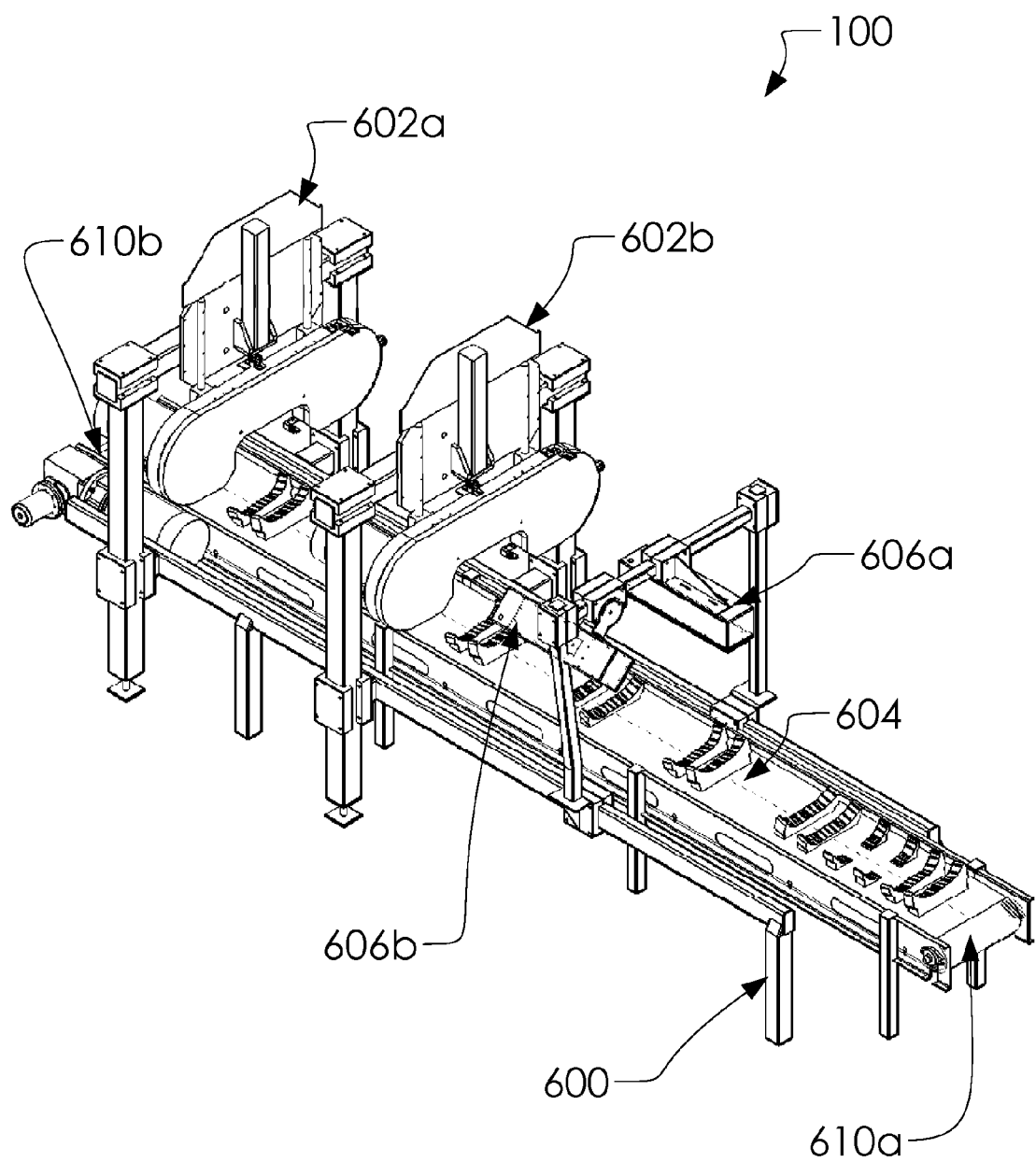
FIG. 6 illustrates an elevated front side overview said automated scanning and butchering system 100.
Figure 7A:
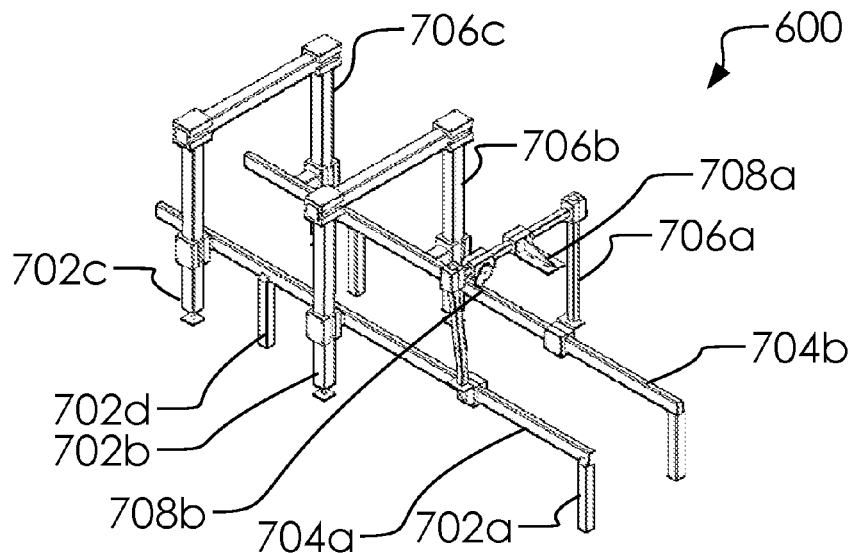
FIGS. 7A, 7B, 7C, 7D and 7E illustrate an elevated overview, an elevated first end view, an elevated front view, an elevated second end view, and an elevated top view of said frame assembly 600.
Figure 7B:
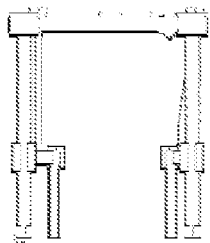
Figure 7C:
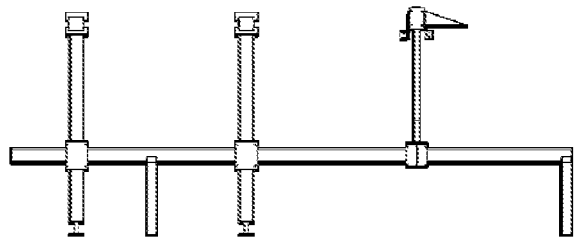
Figure 7D:
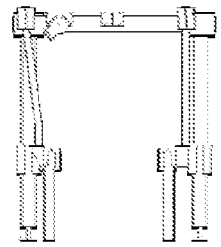
Figure 7E:
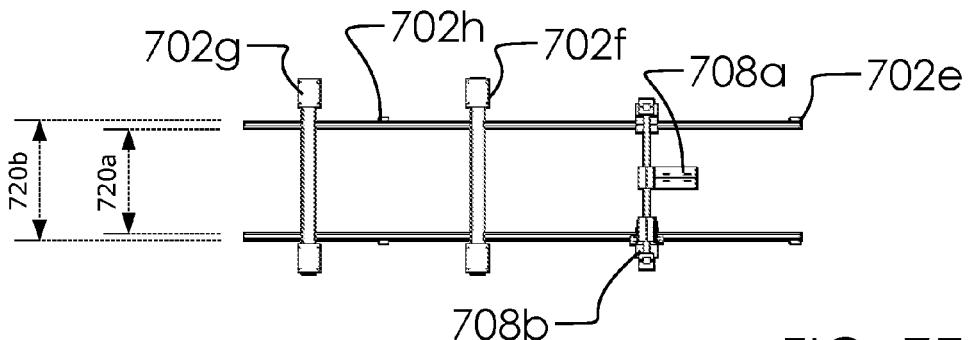

FIG. 6 illustrates an elevated front side overview said automated scanning and butchering system 100.

In one embodiment, said automated scanning and butchering system 100 can comprise said scanning system 122 (which can comprise a one or more scanners), said butchering system 124 (which can comprise a one or more saw assemblies), a frame assembly 600, and a conveyor system 604. In one embodiment, said one or more saw assemblies can comprise a first saw assembly 602a and a second saw assembly 602b. In one embodiment, said one or more scanners can comprise a first scanner 606a and a second scanner 606b. In one embodiment, said conveyor system 604 can comprise a first end 610a and a second end 610b. In one embodiment, said conveyor system 604 can be used to convey objects between said first end 610a and said second end 610b. In one embodiment, said frame assembly 600 can support said automated scanning and butchering system 100 and hold said conveyor system 604, said one or more saw assemblies, and said one or more scanners.

FIGS. 7A, 7B, 7C, 7D and 7E illustrate an elevated overview, an elevated first end view, an elevated front view, an elevated second end view, and an elevated top view of said frame assembly 600.

In one embodiment, said frame assembly 600 can comprise a plurality of legs, a pair of horizontal rails, a plurality of risers and a one or more brackets. In one embodiment, said plurality of legs can comprise a first leg 702a, a second leg 702b, a third leg 702c, a fourth leg 702d, a fifth leg 702e, a sixth leg 702f, a seventh leg 702g and an eighth leg 702h. In one embodiment, a portion of said plurality of legs can comprise variable height threaded feet, as is known in the art; said portion can comprise said second leg 702b, said third leg 702c, said sixth leg 702f and said seventh leg 702g. In one embodiment, said plurality of risers can comprise a first riser 706a, a second riser 706b, and a third riser 706c. In one embodiment, said one or more brackets can comprise a first bracket 708a and a second bracket 708b. In one embodiment, said pair of horizontal rails can comprise a first rail 704a and a second rail 704b.

FIGS. 8A, 8B, 8C, 8D and 8E illustrate an elevated overview, an elevated top view, an elevated first side view, an elevated front view and an elevated backside view of said first saw assembly 602a.

In one embodiment, said first saw assembly 602a and said second saw assembly 602b can be substantially similar, accordingly, FIG. 8A-8E are illustrated as the same device. In one embodiment, said first saw assembly 602a can comprise an upper portion 801 covered by an upper case 802, a lower portion 803 covered by a lower case 804 and a motor 806.

Figure 9:
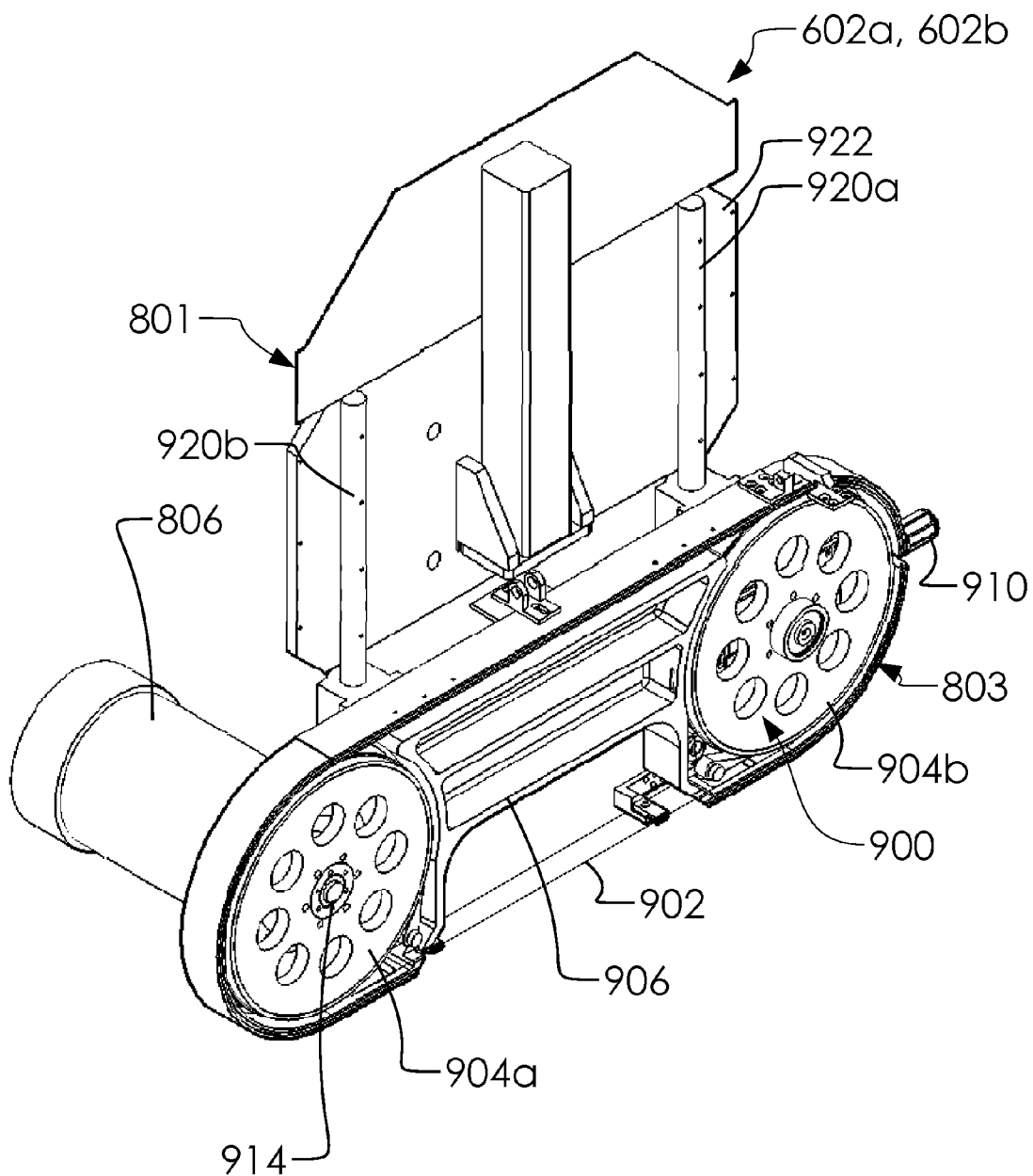
FIG. 9 illustrates an elevated overview of said first saw assembly 602a without a portion of said upper case 802 and said lower case 804.

FIG. 9 illustrates an elevated overview of said first saw assembly 602a without a portion of said upper case 802 and said lower case 804.

In one embodiment, each of said one or more saw assemblies can each comprise a band saw 900 which can comprise a first wheel 904a, a second wheel 904b, a blade 902, an arm 906, and a wheel tensioner 910. In one embodiment, said first wheel 904a can be connected to and driven by said motor 806 with a drive hub subassembly 914. In one embodiment, said lower case 804 can be selectively disassembled with a latch assembly 906. As is known in the art, said blade 902 can be driven between said first wheel 904a and said second wheel 904b. In one embodiment, said blade 902 can be tightened between said first wheel 904a and said second wheel 904b with said wheel tensioner 910. In one embodiment, said upper portion 801 can comprise an upper plate 922 attached to a one or more rods (which can comprise a first rod 920a and a second rod 920b).

Figure 10:
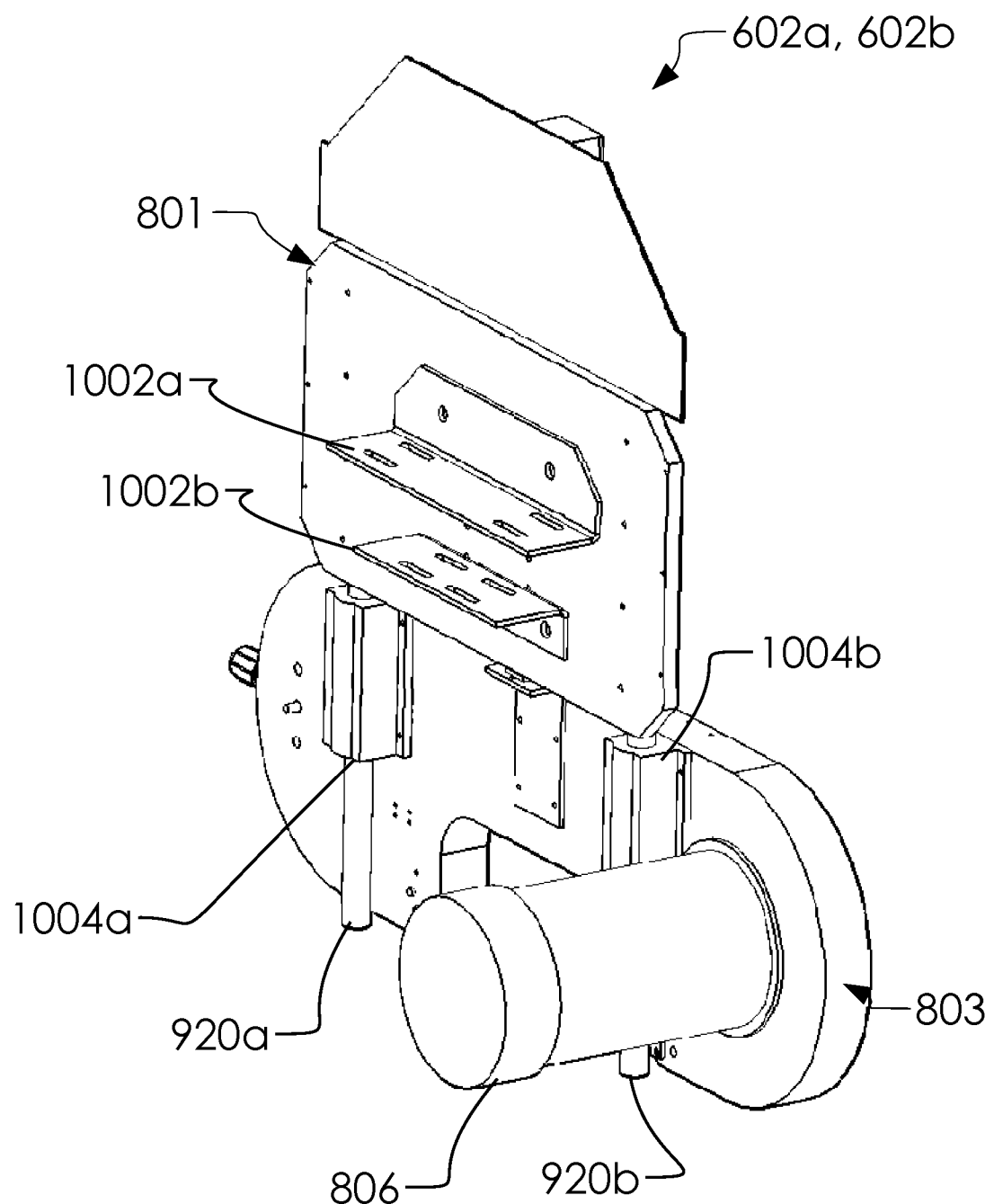

FIG. 10 illustrates an elevated rear overview of said first saw assembly 602a.

In one embodiment, said first saw assembly 602a can comprise a one or more brackets (which can comprise a first bracket 1002a and a second bracket 1002b). In one embodiment, said one or more brackets can attach said first saw assembly 602a to said plurality of risers. In one embodiment, said lower portion 803 can comprise a one or more servo motor actuators (which can comprise a first one or more servo motor actuators 1004a and a second servo motor actuator 1004b). In one embodiment, said one or more rods can be attached to said upper portion 801 at said upper plate 922 and said one or more servo motor actuators attach to said lower portion 803. In one embodiment, said upper portion 801 can move vertically relative to said lower portion 803 by activating and adjusting said one or more servo motor actuators, as is known in the art.

Figure 11A:
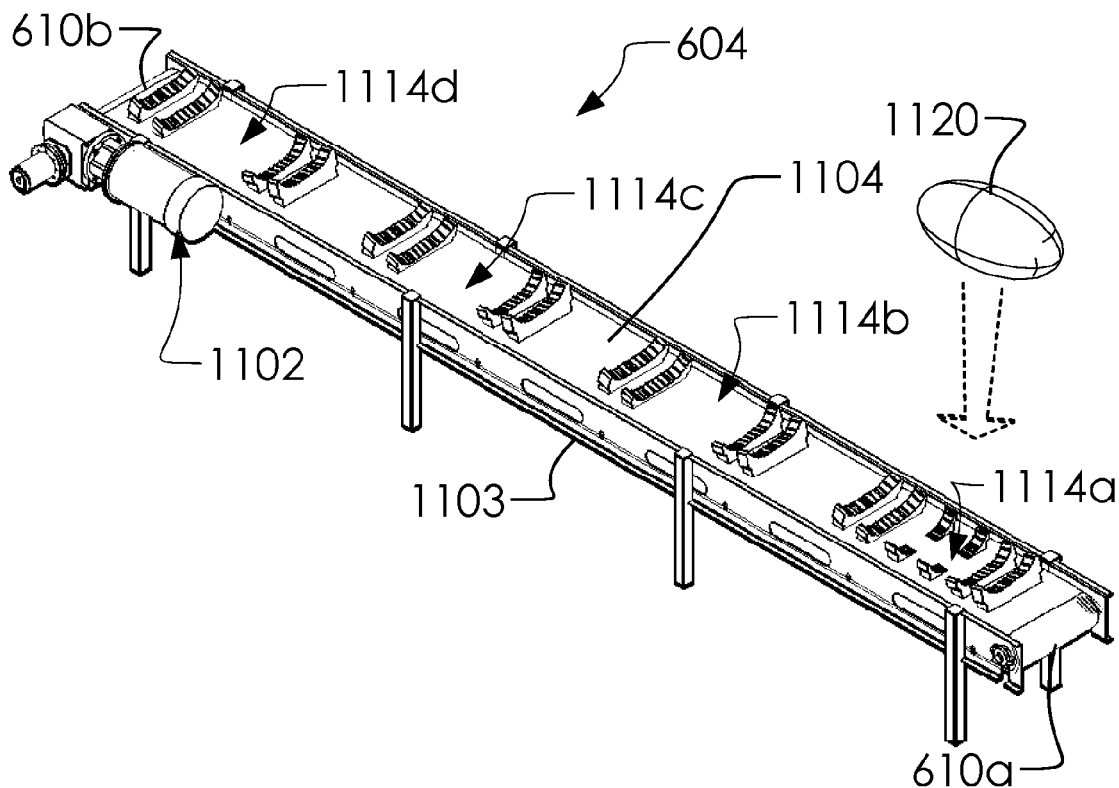
FIGS. 11A and 11B illustrate an elevated overview of said conveyor system 604 and an elevated overview of a drive assembly 1102.
Figure 11B:
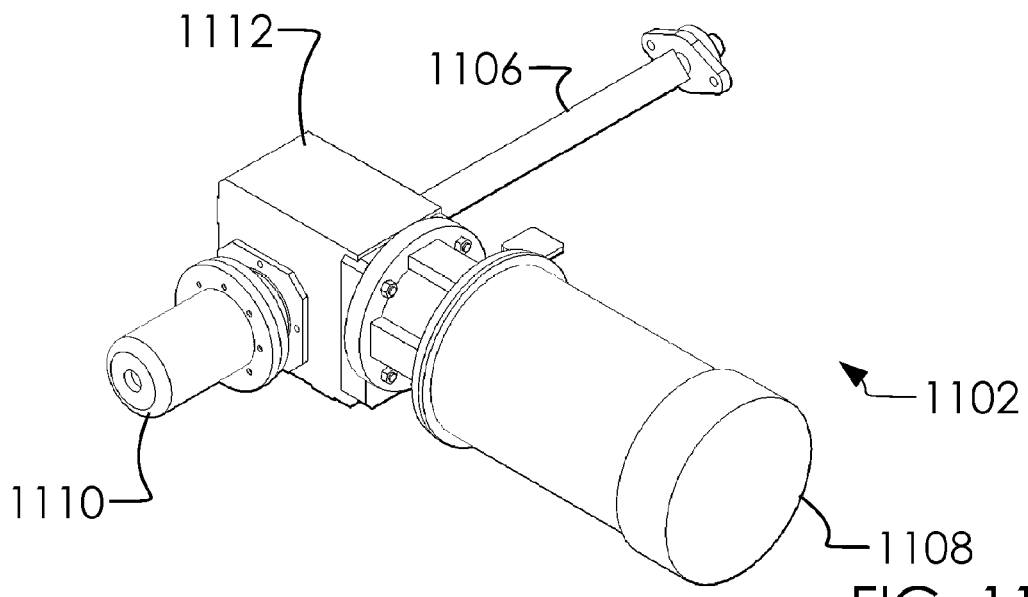

FIGS. 11A and 11B illustrate an elevated overview of said conveyor system 604 and an elevated overview of a drive assembly 1102.

In one embodiment, said conveyor system 604 can comprise said drive assembly 1102 mounted to a platform 1103 which can drive a conveyor belt 1104. In one embodiment, said drive assembly 1102 can comprise a drive shaft 1106, a motor 1108, an encoder 1110, and a stober 1112. In one embodiment, said motor 1108 can drive said drive shaft 1106 which in turn drives said conveyor belt 1104. In one embodiment, said conveyor belt 1104 can comprise a one or more cradles (which can comprise a first cradle 1114a, a second cradle 1114b, a third cradle 1114c, and a fourth cradle 1114d). In one embodiment, said one or more cradles can securely hold a target object 1120. In one embodiment, said target object 1120 can be conveyed from said first end 610a to said second end 610b as said one or more saw assemblies remove unwanted portions from said target object 1120.

Figure 12A:
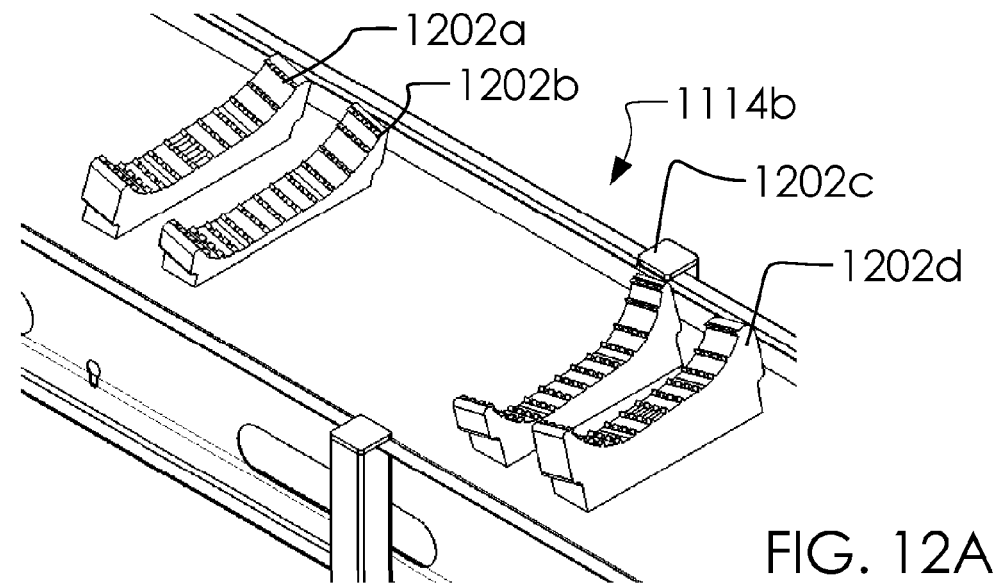
FIGS. 12A, 12B and 12C illustrate an elevated overview of said second cradle 1114b and said first cradle 1114a, and an elevated front cross-section view of said first cradle 1114a, respectively.
Figure 12B:
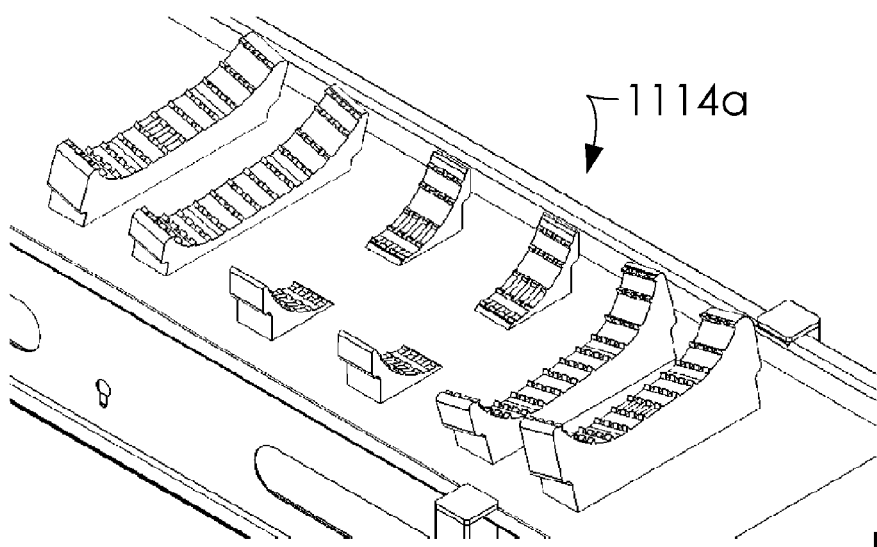
Figure 12C:
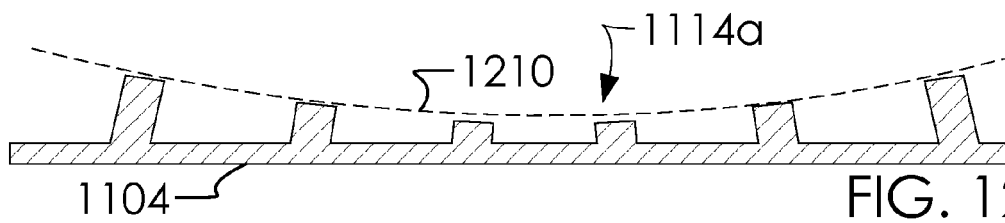

FIGS. 12A, 12B and 12C illustrate an elevated overview of said second cradle 1114b and said first cradle 1114a, and an elevated front cross-section view of said first cradle 1114a, respectively.

In one embodiment, said one or more cradles can each comprise a plurality of supports (which can comprise a first support 1202a, a second support 1202b, a third support 1202c and a fourth support 1202d). In one embodiment, said plurality of supports 1202 can be generally arranged so as to hold said drive assembly 1102 along a concave cradle 1210.

Figure 13:
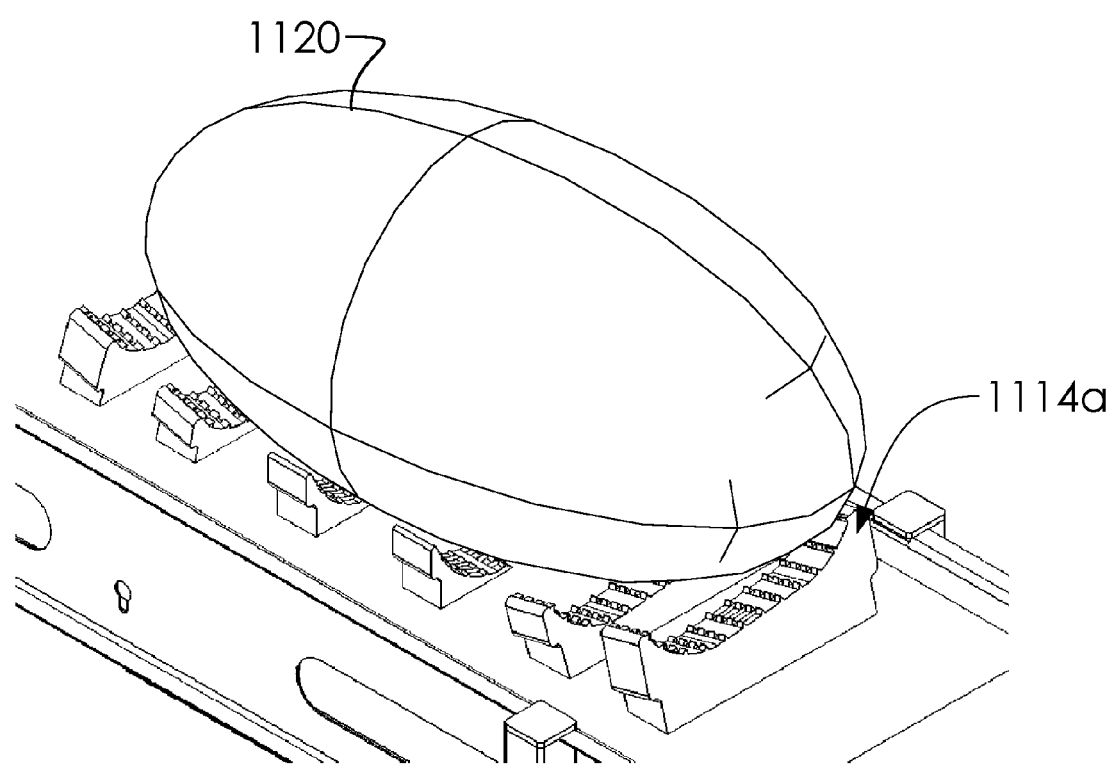
FIG. 13 illustrates an elevated overview of said first cradle 1114a with said target object 1120.

FIG. 13 illustrates an elevated overview of said first cradle 1114a with said target object 1120.

In one embodiment, said one or more cradles can hold a one or more of said target object 1120, or similar.

Figure 14A:
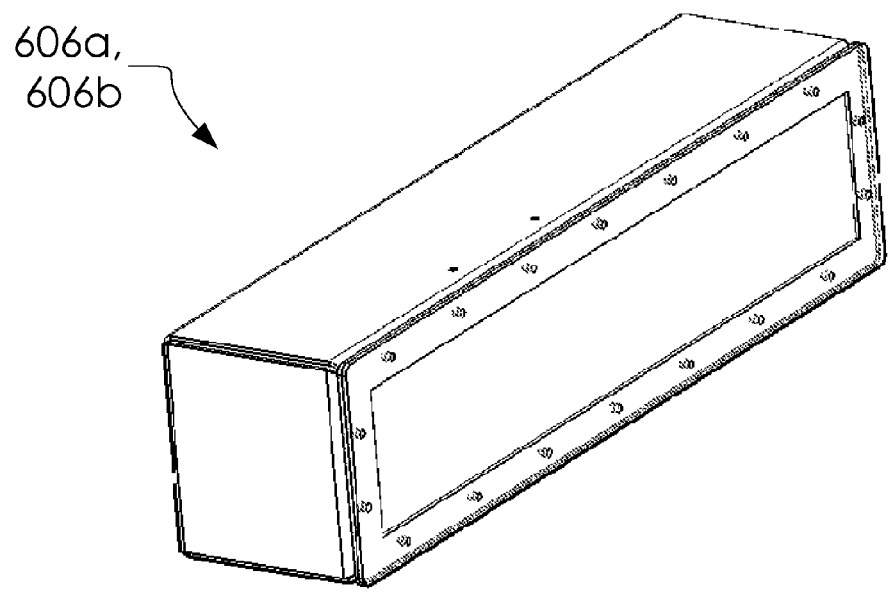
Figure 14B:
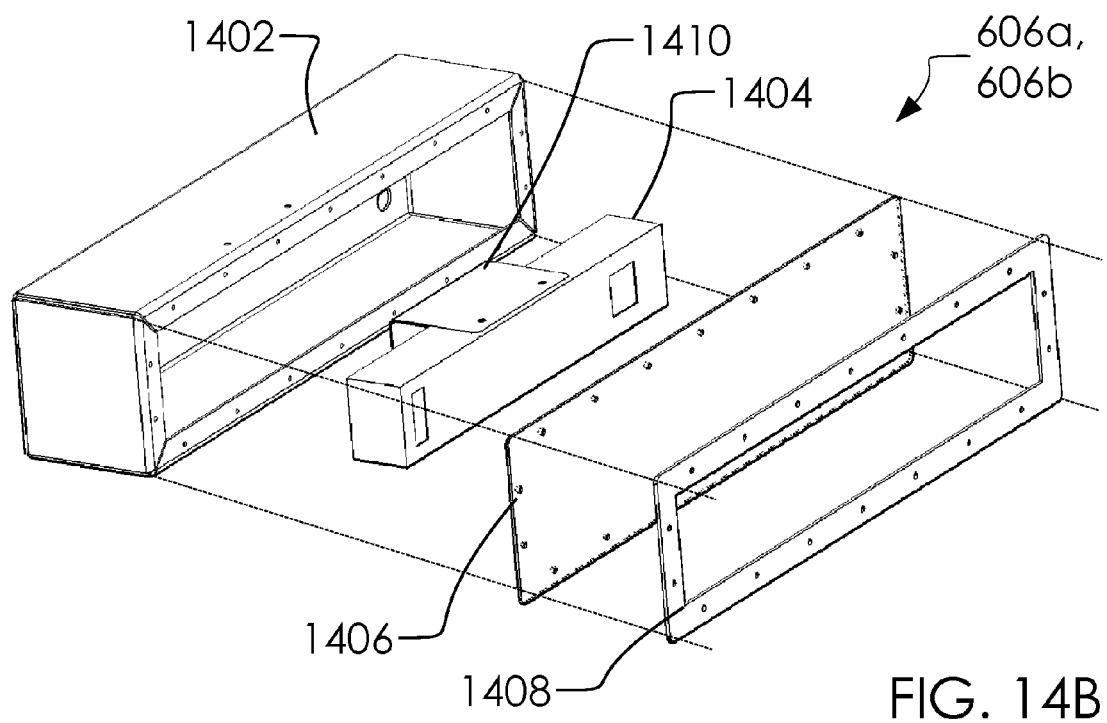

FIGS. 14A and 14B illustrate an elevated overview and an exploded elevated overview of said first scanner 606a.

In one embodiment, each of said one or more scanners can be substantially similar, so discussions of said first scanner 606a can be similar to that of said second scanner 606b. In one embodiment, said first scanner 606a can comprise a case 1402, a sensor 1404, a screen 1406, a frame 1408, and a mounting bracket 1410. In one embodiment, said mounting bracket 1410 can hold said sensor 1404 within said case 1402. In one embodiment, said sensor 1404 can scan through said screen 1406. In one embodiment, said frame 1408 can hold said screen 1406 in place over said case 1402.

Figure 15A:
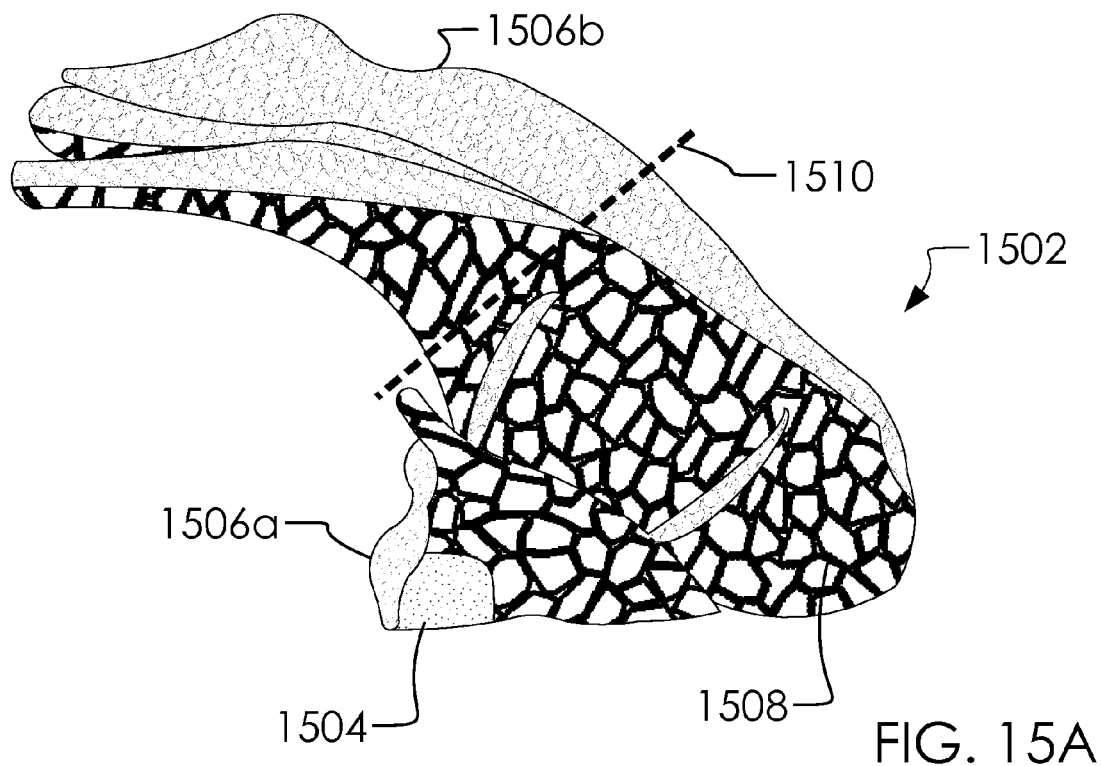
FIGS. 15A, 15B and 15C illustrate a cross-section elevated front view, and two perspective overviews of a meat 1502.
Figure 15B:
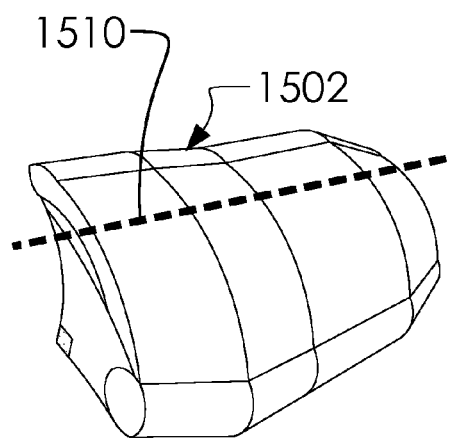
Figure 15C:
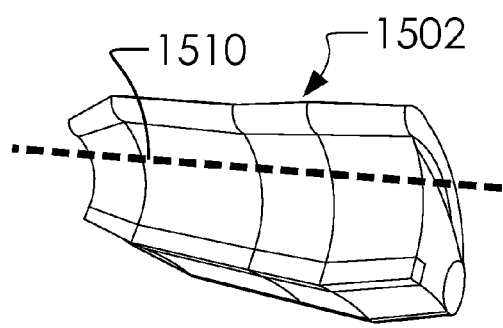

FIGS. 15A, 15B and 15C illustrate a cross-section elevated front view, and two perspective overviews of a meat 1502.

In one embodiment, said meat 1502 can comprise bone portion 1504, a fat portion 1506a, a fat portion 1506b and a meat portion 1508. In one embodiment, maintaining a portion of said meat 1502 for resale as a food product. In one embodiment, a useful amount of said meat 1502 can be harvested below a trim line 1510. In one embodiment, calculating where said trim line 1510 should be can be accomplished by said scanning system 122. In one embodiment, said automated scanning and butchering system 100 can separate said meat 1502 in to useful portions.

Figure 16A:
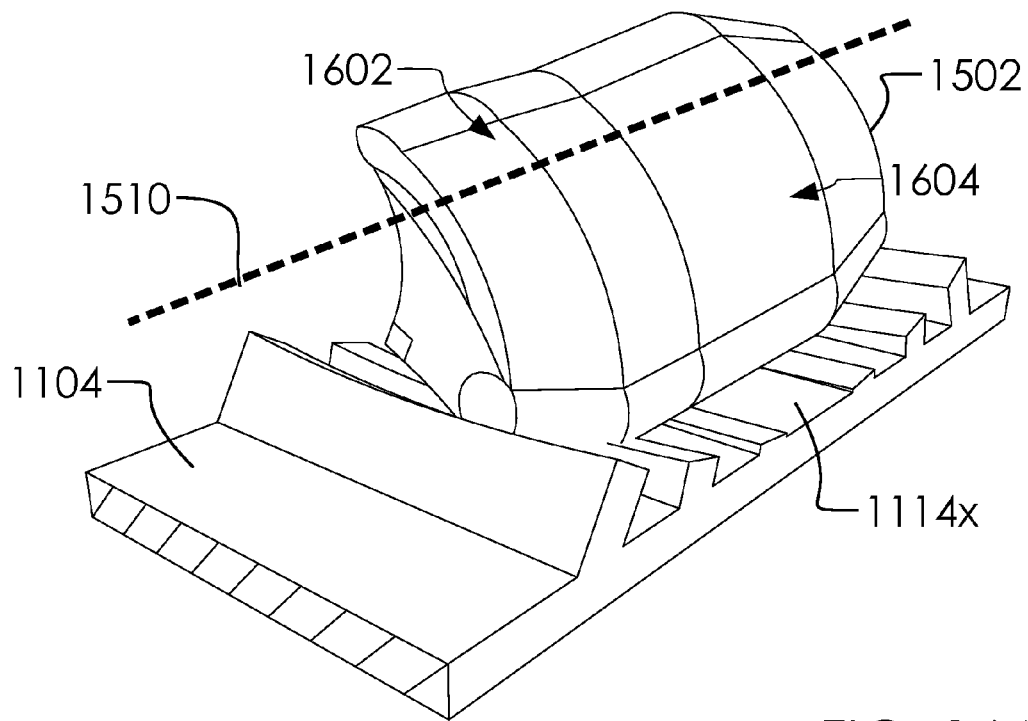
FIGS. 16A and 16B illustrate a first side and a second side perspective overview of said meat 1502 on said conveyor belt 1104.
Figure 16B:
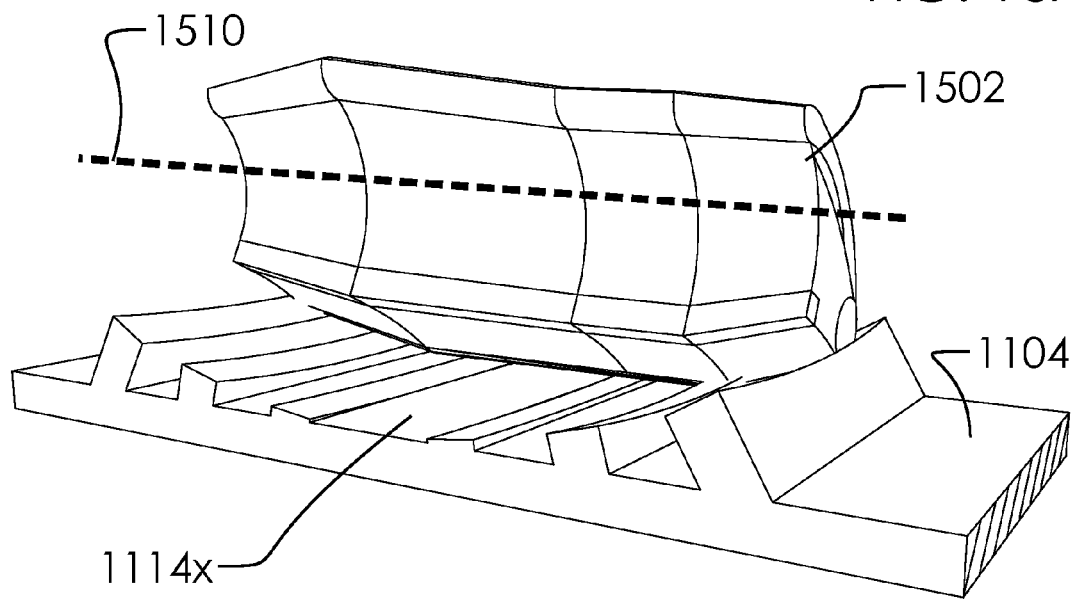

FIGS. 16A and 16B illustrate a first side and a second side perspective overview of said meat 1502 on said conveyor belt 1104.

In one embodiment, said meat 1502 can be placed on one of said one or more cradles (here a cradle 1114x) so as to position a discarded portion 1602 of said meat 1502 upward and a saved portion 1604 toward said conveyor belt 1104. In one embodiment, said cradle 1114x can comprise one among said one or more cradles.

Figure 17:
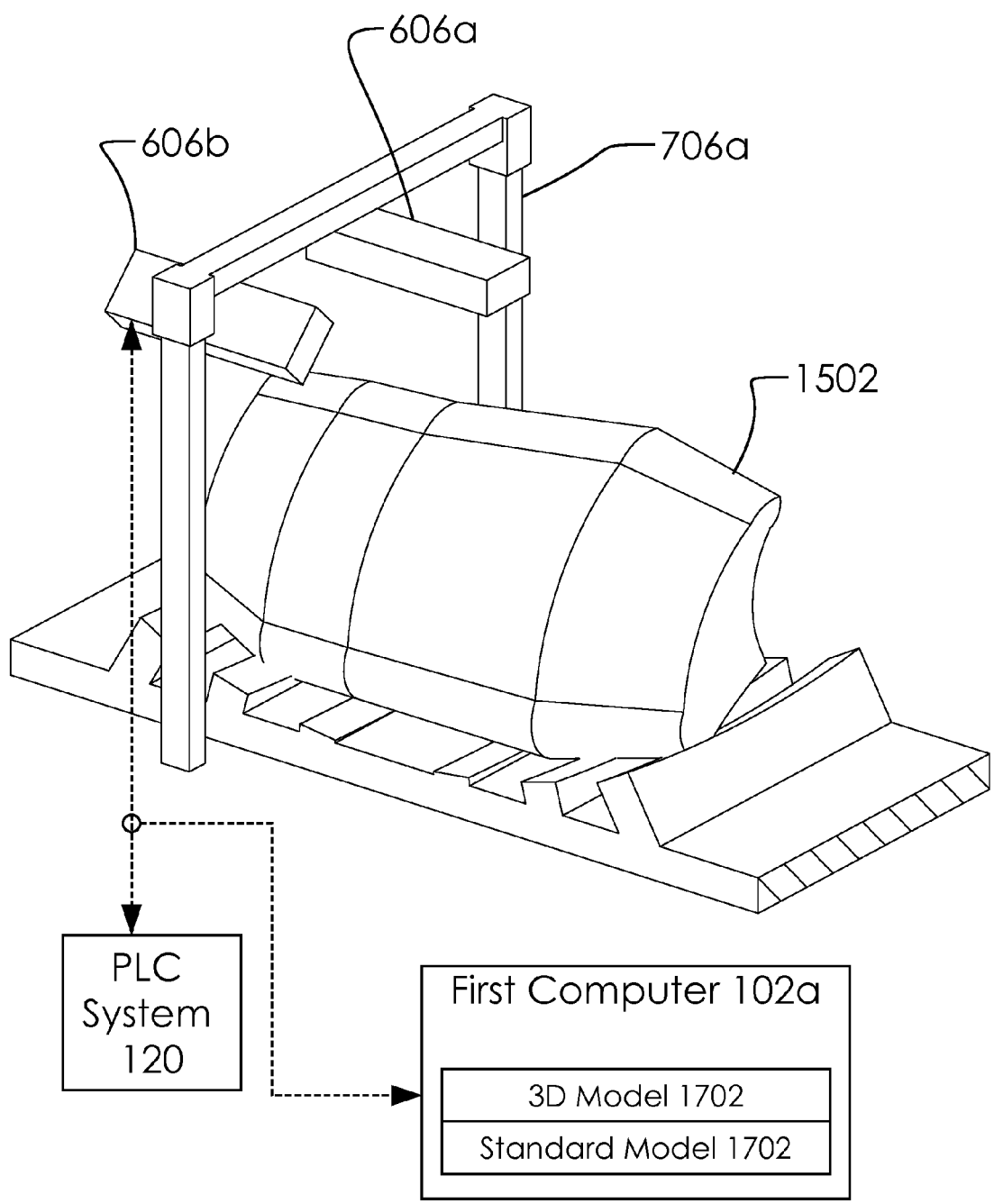
FIG. 17 illustrates an elevated overview of said automated scanning and butchering system 100 in a scanning step.
Figure 18A:
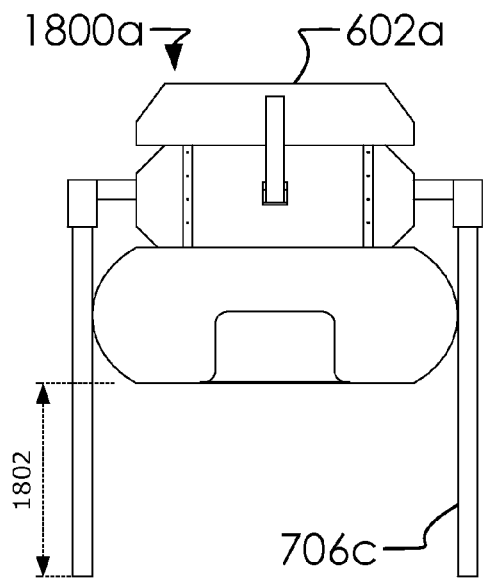
FIGS. 18A, 18B, 18C and 18D illustrate an elevated front and rear view said first saw assembly 602a in a disengaged configuration 1800a and an engaged configuration 1800b, respectively.
Figure 18B:
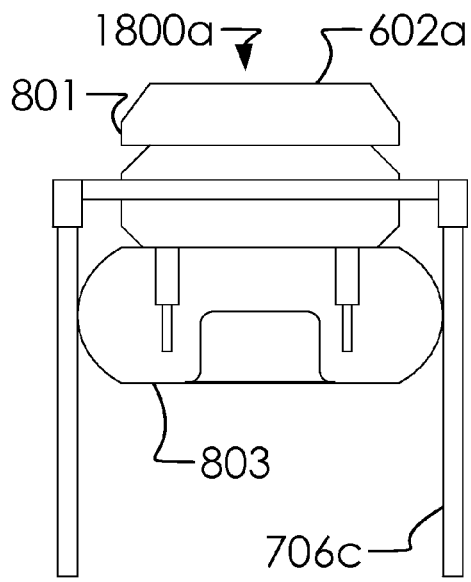
Figure 18C:
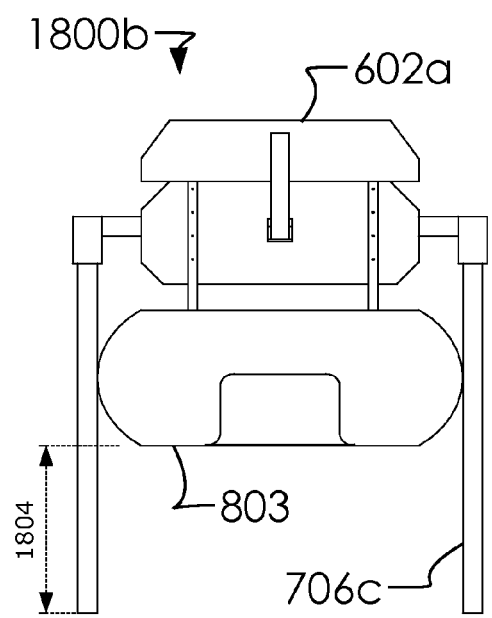
Figure 18D:
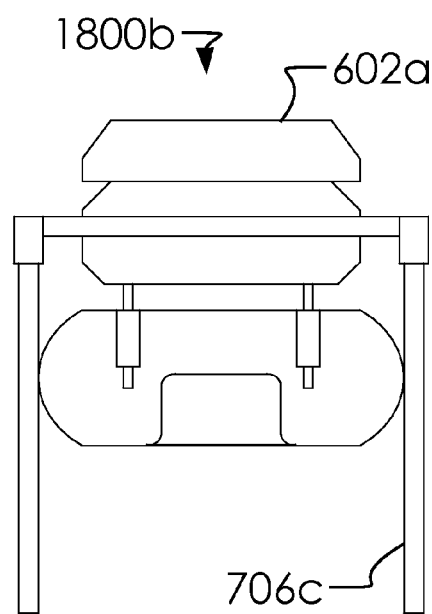

FIG. 17 illustrates an elevated overview of said automated scanning and butchering system 100 in a scanning step.

In one embodiment, said meat 1502 can be conveyed under said one or more scanners for 3D scanning. In one embodiment, 3D scanning can analyze a real-world object (such as said target object 1120 and/or said meat 1502) in order to collect data on its shape and, in turn, to construct a 3D Model 1702 in said first computer 102a (or any digital system). In one embodiment, said first computer 102a can comprise a standard model 1704. In one embodiment, said 3D Model 1702 and/or said standard model 1704 can be stored in said data records 504 and/or said data storage 110 on said first computer 102a and/or said PLC system 120.

FIGS. 18A, 18B, 18C and 18D illustrate an elevated front and rear view said first saw assembly 602a in a disengaged configuration 1800a and an engaged configuration 1800b, respectively.

In one embodiment, said first saw assembly 602a can set said lower portion 803 to a variable height such as a maximum height 1802 and a cutting height 1804. In one embodiment, said PLC system 120 can control where said lower portion 803 is set to. In one embodiment, said upper portion 801 and said lower portion 803 can move relative to one another. In one embodiment, said disengaged configuration 1800a can comprise said lower portion 803 at said maximum height 1802; and said engaged configuration 1800b can comprise said lower portion 803 at one of a number of heights, including said cutting height 1804.

Figure 19A:
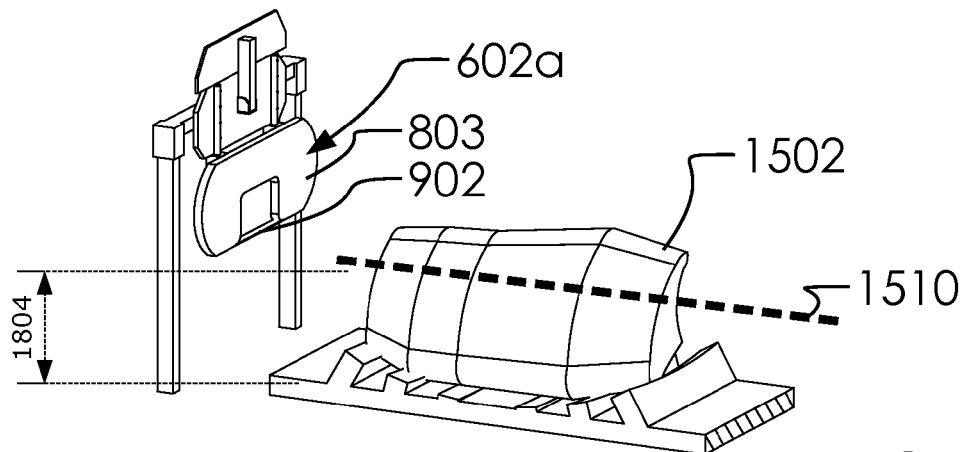
FIGS. 19A, 19B and 19C illustrate said automated scanning and butchering system 100 in a pre-cutting step, a cutting step and a post-cutting step, respectively.
Figure 19B:
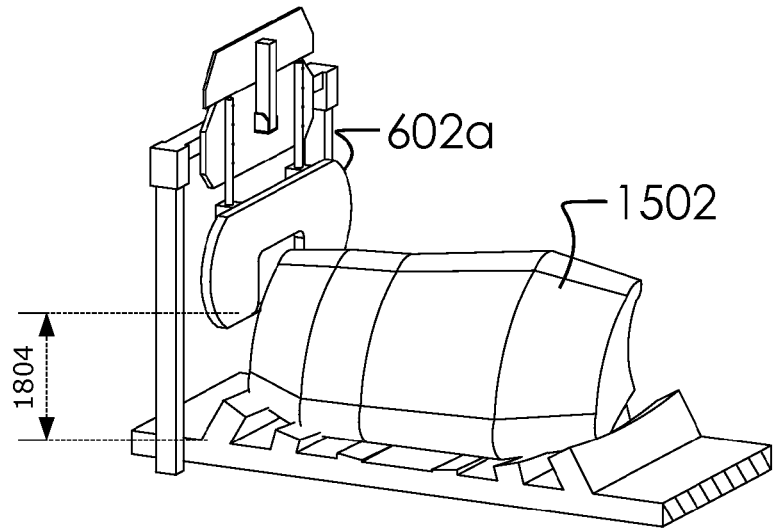
Figure 19C:
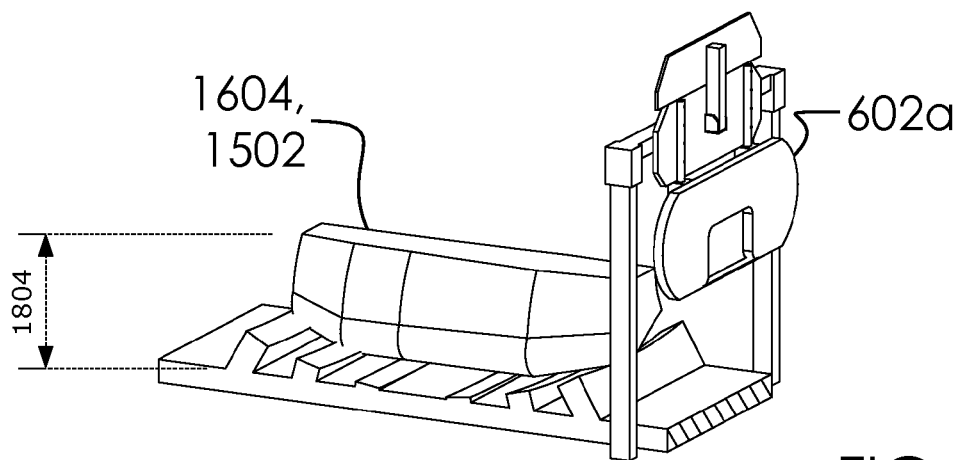

FIGS. 19A, 19B and 19C illustrate said automated scanning and butchering system 100 in a pre-cutting step, a cutting step and a post-cutting step, respectively.

In one embodiment, said pre-cutting step can comprise assessing said trim line 1510 with said PLC system 120 and said first computer 102a in software, setting said lower portion 803 to a corresponding height (such as said cutting height 1804), and conveying said meat 1502 toward said first saw assembly 602a. In one embodiment, said cutting step can comprise: conveying said meat 1502 through said blade 902, cutting said meat 1502 into said discarded portion 1602 and said saved portion 1604. In one embodiment, said post-cutting step can comprise: conveying said saved portion 1604 of said meat 1502 past said first saw assembly 602a.

Figure 20:
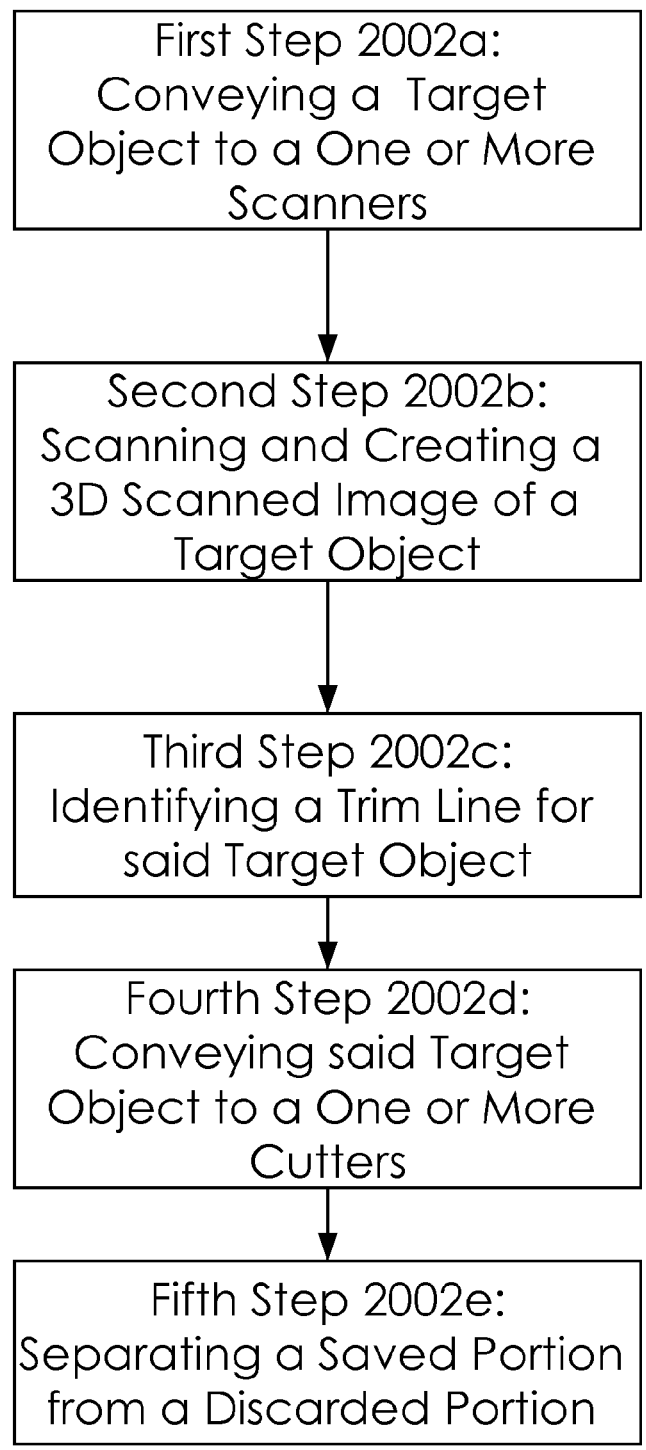
FIG. 20 illustrates flow diagram of a method of scanning and butchering 2000.

FIG. 20 illustrates flow diagram of a method of scanning and butchering 2000.

In one embodiment, said method of scanning and butchering 2000 can comprise a method of using said automated scanning and butchering system 100. In one embodiment, said method of scanning and butchering 2000 can comprise a first step 2002a, a second step 2002b, a third step 2002c, a fourth step 2002d, and a fifth step 2002e. In one embodiment, said first step 2002a can comprise conveying said target object 1120 toward said one or more scanners on said conveyor belt 1104. In one embodiment, said second step 2002b can comprise: scanning said target object 1120 (and/or said meat 1502) with said one or more scanners and creating said 3D Model 1702 thereof. In one embodiment, said third step 2002c can comprise identifying said trim line 1510 of said target object 1120 (and/or said meat 1502). In one embodiment, said fourth step 2002d can comprise conveying said target object 1120 (and/or said meat 1502) toward said one or more saw assemblies on said conveyor belt 1104. In one embodiment, said fifth step 2002e can comprise separating said target object 1120 (and/or said meat 1502) into said discarded portion 1602 and/or said saved portion 1604.

Figure 21A:
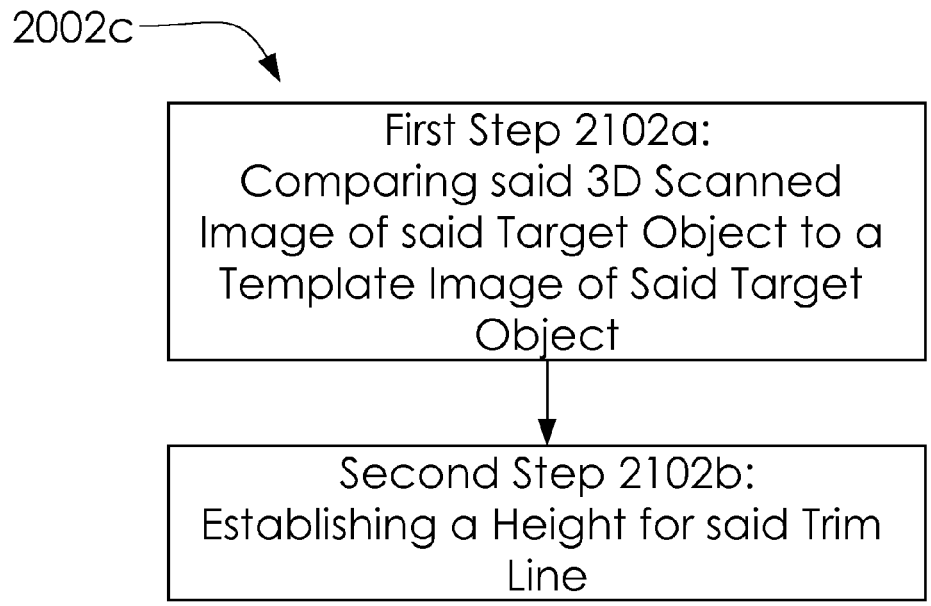
FIGS. 21A and 21B illustrate two detailed sets of method steps for using said automated scanning and butchering system 100.
Figure 21B:
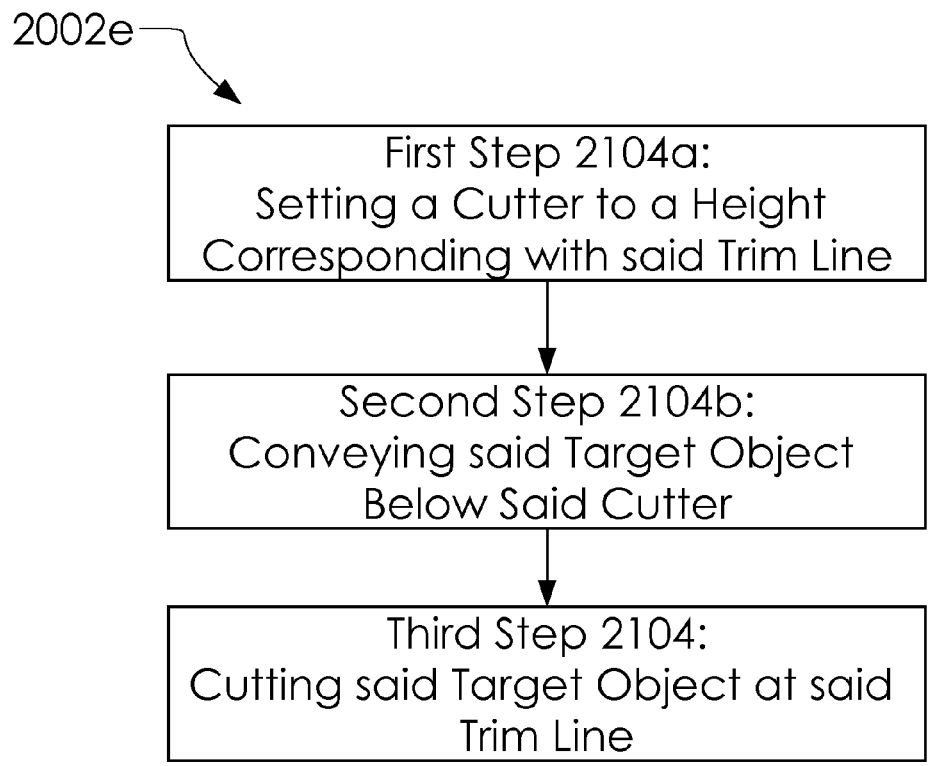

FIGS. 21A and 21B illustrate two detailed sets of method steps for using said automated scanning and butchering system 100.

In one embodiment, said third step 2002c of said method of scanning and butchering 2000 can comprise a first step 2102a and a second step 2102b. In one embodiment, said first step 2102a can comprise: comparing said 3D Model 1702 to said standard model 1704 (which can comprise a template image for identifying said discarded portion 1602 and said saved portion 1604). In one embodiment, said second step 2102b can comprise: establishing said trim line 1510.

In one embodiment, said fifth step 2002e of said method of scanning and butchering 2000 can comprise a first step 2104a, a second step 2104b and a third step 2104c. In one embodiment, said first step 2104a can comprise: setting said blade 902 of said first saw assembly 602a to said cutting height 1804 which corresponds to said trim line 1510. In one embodiment, said second step 2104b can comprise: conveying said meat 1502 below said blade 902 of said one or more saw assemblies with said conveyor belt 1104. In one embodiment, said third step 2104 can comprise: cutting said meat 1502 with said blade 902 at said cutting height 1804 and/or said trim line 1510.

Figure 22A:
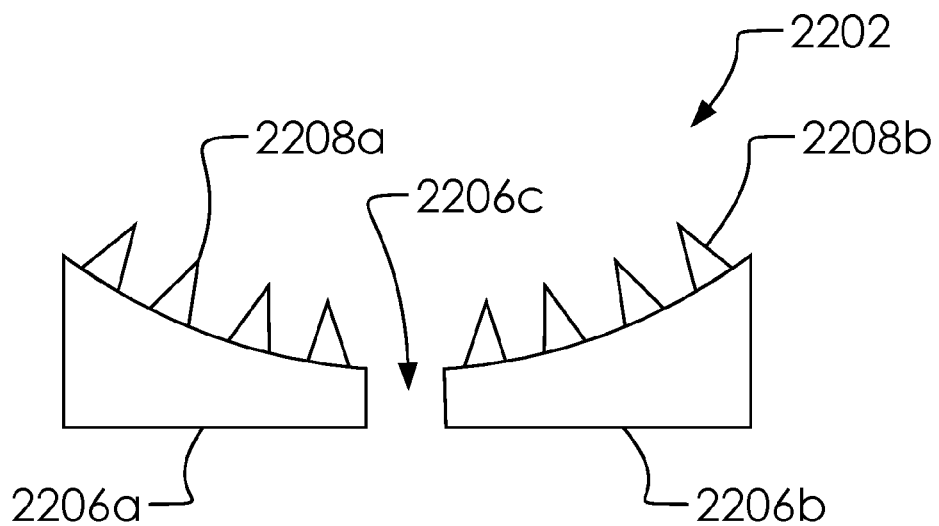
FIGS. 22A and 22B illustrate an elevated front view of a beef support 2202 and a pork support 2204, respectively.
Figure 22B:
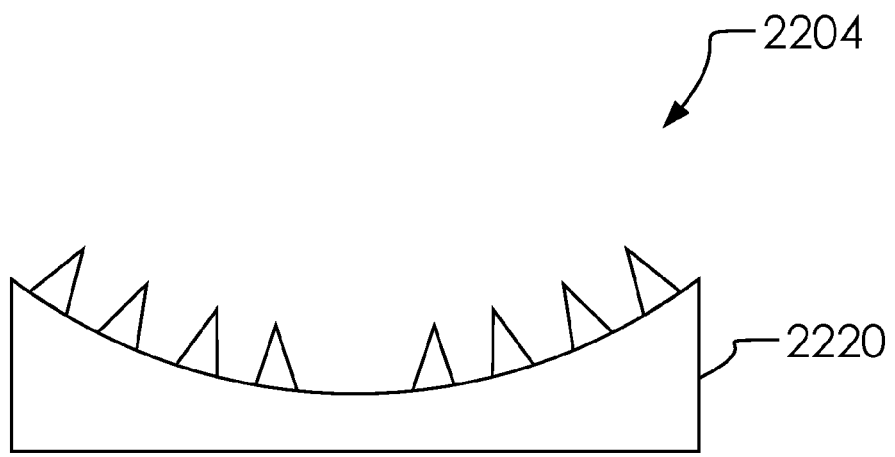

FIGS. 22A and 22B illustrate an elevated front view of a beef support 2202 and a pork support 2204, respectively.

In one embodiment, said beef support 2202 can comprise a first side portion 2206a, a second side portion 2206b, a gap 2206c, a first set of grippers 2208a on said first side portion 2206a and a first set of grippers 2208a on said second side portion 2206b. In one embodiment, said beef support 2202 can be designed with said gap between said first side portion 2206a and said second side portion 2206b so as to allow beef to reach said conveyor belt 1104 as it is thicker than other types of meat.

In one embodiment, said pork support 2204 allows said plurality of supports 1202 to pinch the meat (here pork) and hold it in place.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. An automated scanning and butchering system, comprising:
    a PLC system, a scanning system and a butchering system in data communication;
    said butchering system comprising a one or more saw assemblies, a conveyor system, a one or more cradles, and a first end and a second end;
    said one or more saw assemblies are arranged between said first end and said second end of said butchering system;
    said conveyor system comprises a conveyor comprising said one or more cradles configured to move items from said first end to said second end of said butchering system;
    said one or more cradles are configured to releaseably receive and hold a target object as said conveyor moves said target object from said first end to said second end of said butchering system; and
    said scanning system comprising a one or more scanners.

2. The automated scanning and butchering system of claim 1, wherein:
    said conveyor comprises a conveyor belt.

3. The automated scanning and butchering system of claim 1, wherein:
    said butchering system further comprises a drive assembly attached to said conveyor; and
    said drive assembly selectively drives said conveyor and objects thereupon between said first end and said second end of said butchering system.

4. The automated scanning and butchering system of claim 3, wherein:
    said drive assembly is in data communication with said PLC system; and
    said PLC system selectively controls movements of said conveyor.

5. The automated scanning and butchering system of claim 4, wherein:
    said drive assembly comprises a encoder, a stober and a drive shaft; and
    said drive shaft is driven by said drive assembly so as to move said conveyor.

6. The automated scanning and butchering system of claim 1, wherein:
    said one or more saw assemblies each comprise a band saw having
        a motor,
        a first wheel,
        a second wheel,
        a blade;
    said blade is arranged between said first wheel and said second wheel; and
    said motor is selectively driven by said motor.

7. The automated scanning and butchering system of claim 1, wherein:

a portion of said one or more saw assemblies selectively comprise variable height settings so as to raise and lower on said target object on said conveyor.

8. The automated scanning and butchering system of claim 7, wherein:
said one or more saw assemblies comprise an upper portion and a lower portion being attached to one another with a one or more rods and a one or more servo motor actuators;
said one or more rods are attached to said upper portion;
said one or more servo motor actuators are attached to said lower portion; and
said one or more saw assemblies selectively adjust their relative vertical distance from one another (and said conveyor) by adjusting said one or more servo motor actuators relative to said one or more rods.

9. The automated scanning and butchering system of claim 1, wherein:
said butchering system comprises a frame assembly;
said frame assembly comprises a pair of horizontal rails supporting said conveyor;
said frame assembly comprises a plurality of risers being arranged above said pair of horizontal rails;
a plurality of risers support said one or more saw assemblies and said scanning system; and
said target object is passed below said scanning system for analysis and said one or more saw assemblies selective trimming.

10. The automated scanning and butchering system of claim 1, wherein:
said target object is a portion of a meat having one or more among the following: a bone portion, a fat portion, and a meat portion.

11. The automated scanning and butchering system of claim 10, wherein:
said scanning system analyzes said meat to determine a trim line; and
said trim line comprises an optimal separation of said meat portion, said fat portion or said bone portion so as to separate said meat into useful portions.

12. The automated scanning and butchering system of claim 11, wherein:
said conveyor by moving said one or more cradles with said meat selectively controls a horizontal location of said meat;
said scanning system analyzes said meat and determines said trim line;
said PLC system is configured to position said meat below said one or more saw assemblies;
a lower portion of said one or more saw assemblies lower onto said meat and cut near said trim line; and
said PLC system is configured to optimize these steps.

13. The automated scanning and butchering system of claim 1, wherein:
said PLC system is configured to
collect a 3D Model of said target object,
compare said 3D Model to a standard model of said target object, and
calculate a trim line for said target object.

14. The automated scanning and butchering system of claim 1, wherein:
said scanning system comprises a one or more scanners arranged on a first riser above said conveyor;
a one or more saw assemblies comprise a first saw assembly attached to a second riser; and
said first riser and said second riser are configured to straddle said conveyor and allow said conveyor and said target object to pass beneath a plurality of risers without interference from said first riser.

15. A method of automatically scanning and butchering meat, comprising:
conveying a target object a one or more scanners on a conveyor belt of an automated scanning and butchering system, scanning said target object with a one or more scanners and creating a 3D Model thereof,
identifying a trim line of said target object,
conveying said target object toward a one or more saw assemblies on said conveyor belt, and
cutting said target object with said one or more saw assemblies; wherein,
said automated scanning and butchering system comprises a PLC system, a scanning system and a butchering system in data communication;
said butchering system comprising a one or more saw assemblies, a conveyor system, a one or more cradles, and a first end and a second end;
said one or more saw assemblies are arranged between said first end and said second end of said butchering system;
said conveyor system comprises a conveyor comprising said one or more cradles configured to move items from said first end to said second end of said butchering system;
said one or more cradles are configured to releaseably receive and hold a target object as said conveyor moves said target object from said first end to said second end of said butchering system; and
said scanning system comprising a one or more scanners.

16. The method of automatically scanning and butchering meat of claim 15 wherein identifying a trim line of said target object comprises:
comparing said 3D Model to a standard model and establishing said trim line; and wherein,
said trim line comprises a template image for identifying a discarded portion and a saved portion of said target object.

17. The method of automatically scanning and butchering meat of claim 15 wherein cutting said target object with said one or more saw assemblies comprises:
setting said blade of a first saw assembly to a cutting height which corresponds to said trim line,
conveying said meat below a blade of said one or more saw assemblies with said conveyor belt, and
cutting said meat with said blade at a cutting height or said trim line.

* * * * *